US005533027A

United States Patent [19]

Åkerberg et al.

[11] Patent Number: 5,533,027
[45] Date of Patent: Jul. 2, 1996

[54] DIGITAL FIXED RADIO ACCESS SYSTEM PROVIDING LOCAL MOBILITY

[75] Inventors: Dag E. Åkerberg, Kungsängen, Sweden; Petrus van de Berg, Enschede, Netherlands

[73] Assignee: Telefonaktiebolaget LM Ericsson, Stockholm, Sweden

[21] Appl. No.: 520,509

[22] Filed: Aug. 28, 1995

Related U.S. Application Data

[63] Continuation of Ser. No. 154,549, Nov. 19, 1993, abandoned.

[30] Foreign Application Priority Data

Feb. 16, 1993 [SE] Sweden ................................ 9300495

[51] Int. Cl.⁶ ............................ H04B 7/204; H04B 7/24; H04Q 7/20
[52] U.S. Cl. ..................... 370/195.1; 370/95.3; 370/97; 379/61; 455/15; 455/33.3
[58] Field of Search ............................ 370/24, 26, 29, 370/30, 50, 75, 85.2, 85.7, 95.1, 95.3, 97; 379/58, 59, 60, 61, 62, 63; 455/7, 15, 17, 25, 33.1, 33.2, 33.3, 33.4, 56.1

[56] References Cited

U.S. PATENT DOCUMENTS

| | | | |
|---|---|---|---|
| 4,577,315 | 3/1986 | Otsuka | 370/95.3 |
| 4,578,815 | 3/1986 | Persinotti | 455/33.4 X |
| 4,731,812 | 3/1988 | Åkerberg | 379/61 |
| 4,748,655 | 5/1988 | Thrower et al. | 379/60 |
| 5,065,449 | 11/1991 | Gordon et al. | 455/33.3 X |
| 5,134,615 | 7/1992 | Freeburg et al. | 370/95.3 |
| 5,134,710 | 7/1992 | Åkerberg | 455/54.1 |
| 5,193,091 | 3/1993 | Crisler et al. | 370/95.1 |
| 5,203,024 | 4/1993 | Yamao | 370/95.1 X |
| 5,285,443 | 2/1994 | Patsiokas et al. | 370/95.3 X |
| 5,349,631 | 9/1994 | Lee | 455/33.3 X |

FOREIGN PATENT DOCUMENTS

| | | |
|---|---|---|
| 0219085 | 4/1987 | European Pat. Off. . |
| 0399611 | 11/1990 | European Pat. Off. . |
| 0412583 | 2/1991 | European Pat. Off. . |
| 0415810 | 3/1991 | European Pat. Off. . |
| 0418096 | 3/1991 | European Pat. Off. . |
| 0418103 | 3/1991 | European Pat. Off. . |
| 0523687 | 1/1993 | European Pat. Off. . |
| 3730052 | 3/1989 | Germany . |
| 8910660 | 11/1989 | WIPO . |

OTHER PUBLICATIONS

Brochure No. LZT 120217, Radio Access System RAS 1000 by Ericsson Radio Access AB.
D. C. Cox Et al., "Universal Digital Portable Communications: An Applied Research Perspective," ICC '86 Toronto, Canada, Jun. 22–25, 1986.
D. Åkerberg, "Novel Radio Access Principles Useful for Third Generation Mobile Radio Systems," 3rd IEEE Int'l Symposium on Personal, Indoor and Mobile Radio Communications, Oct. 19–21, 1992.
ETSI, "Radio Equipment and Systems (RES); Digital European Cordless Telecommunications (DECT) Common Interface," ETS 300175-1 (Oct. 1992) pp. 1–30.

(List continued on next page.)

Primary Examiner—Melvin Marcelo
Attorney, Agent, or Firm—Burns, Doane, Swecker & Mathis

[57] ABSTRACT

An arrangement for radio communication includes a first radio station or base station, a number of second radio stations, and a number of subscriber stations. The second radio stations each include a digital radio arrangement and first and second devices for, respectively, communicating with the first station and with a subscriber station. The first device includes a long-range antenna for communication with the first station. The second device includes an antenna for communication with at least one of the subscriber stations. The digital radio arrangement includes a radio switch having a common transceiver providing wireless communication with the first station as well as with a subscriber station.

30 Claims, 16 Drawing Sheets

OTHER PUBLICATIONS

ETSI, "Radio Equipment and Systems (RES); Digital European Cordless Telecommunications (DECT) Common Interface," ETS 300175–3, pp. 168–174 (Oct. 1992).

ETSI "Radio Equipment and Systems (RES); Digital European Cordless Telecommunications (DECT) Common Interface," ETS 300175–6, Oct. 1992, pp. 7, 16, 17, 20, 21, 25–29 & 37–39.

ETSI, "Radio Equipment and Systems Digital European Cordless Telecommunications (DECT) Reference Document," ETR 015 (Mar. 1991) pp. 1–44.

ETSI, "Radio Equipment and Systems (RES); Digital European Cordless Telecommunications (DECT) Common Interface Services and Facilities Requirements Specification," ETR 043 (Jul. 1992) pp. 1–95.

ETSI, "Radio Equipment and Systems (RES); Digital European Cordless Telecommunications (DECT) A Guide to DECT Features that Influence the Traffic Capacity and the Maintenance of High Radio Link Transmission Quality, Including the Results of Simulations," ETR 042 (Jul. 1992) pp. 1–53.

FIG. 2
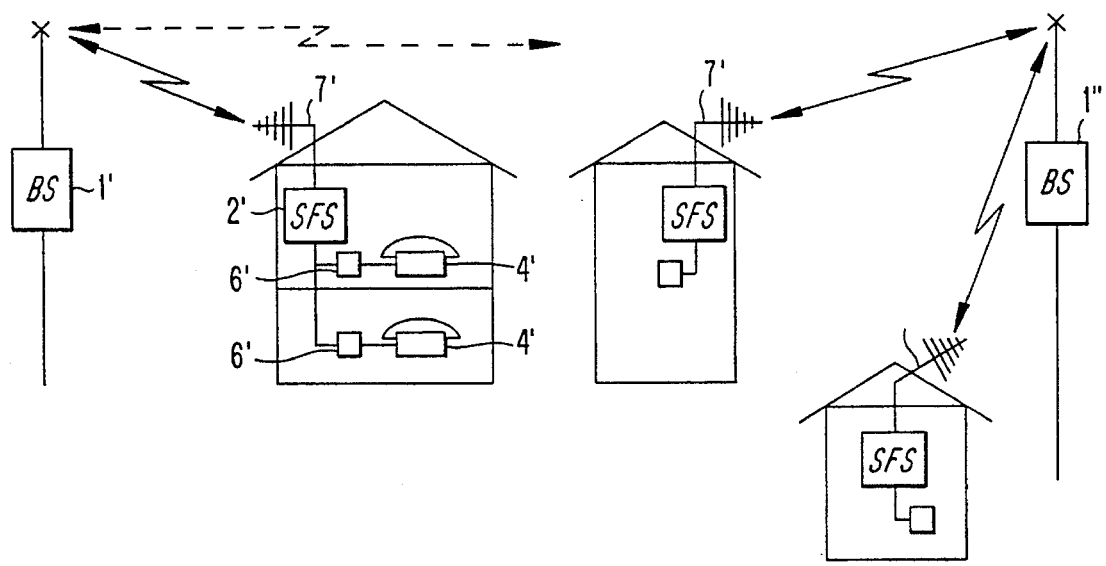
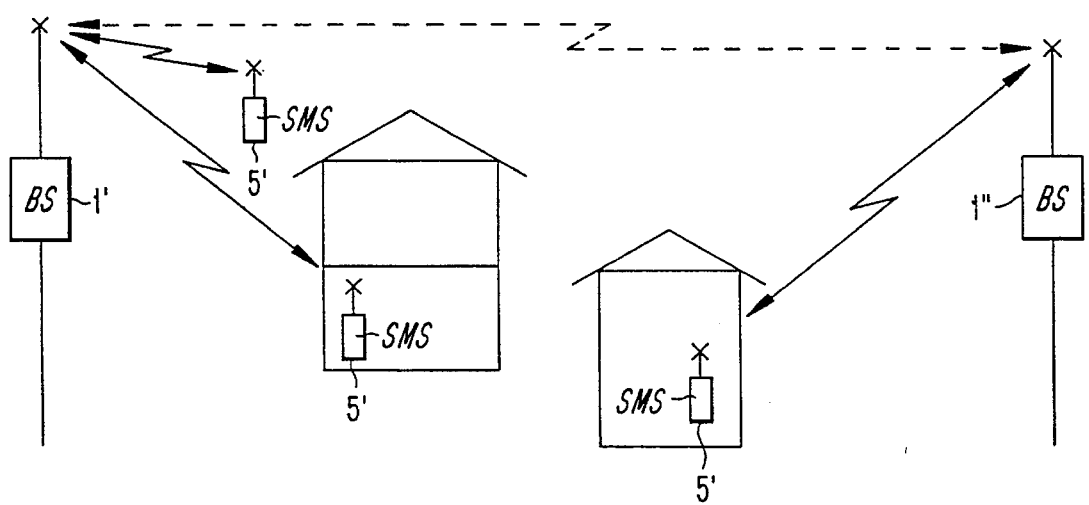
FIG. 3

DIGITAL FIXED RADIO ACCESS SYSTEM PROVIDING LOCAL MOBILITY

This application is a continuation of application Ser. No. 08/154,549, filed Nov. 19, 1993, abandoned.

BACKGROUND

The present invention relates to arrangements for radio communication comprising first station(s) or base station(s), a number of second radio stations and a number of subscriber stations wherein said radio station(s) comprise(s) at least one digital radio arrangement.

Up to now the connections to the overwhelming majority public telephone subscribers, also to residences, offices, is made by wiring. This means that even if the network implements radio technology, e.g. by satellite, the last part of the network mostly uses wiring, i.e. most local connections are in the form of wires. However, the installation of wired connections especially for the local loop e.g. residences, offices, etc is both time consuming and involves substantial networking costs. Therefore there is an increasing interest in exploring the potential of radio technology as an alternative for wiring in the local loop. This is among others of general interest for new second and third public network operators since it provides fast installation and can provide local mobility as an advantage. For a first dominant operator it is of interest at least for niche markets. Another problem, however not general but merely relevant to some countries, is that the regulations in these particular countries for public telephone operators prevent them from offering mobility in the PSTN/ISDN (Public Switched Telephone Network/Integrated Services Digital Network).

Some attempts have been done to use radio link connections to the subscriber. The concept itself is called Radio in the Local Loop, or in short form RLL. The traditional, wired, connection, will in the following be called Wired Local Loop, WLL. FIG. 1 show a simplified illustration of Wired Local Loops, WLL- and Radio Local Loops, RLL-connections with public subscribers, residences as well as offices. BS Stands for Base Station.

As to the concept of the Radio in the Local Loop, RLL, this can be divided into two basic concepts, namely the so called Fixed Radio in the Local Loop, FRLL, and the Mobile Radio in the Local Loop, MRLL. These two concepts are illustrated in FIGS. 2 and 3 respectively.

In FIG. 2 the Fixed Radio in the Local Loop concept is illustrated. In this case the subscriber has one or more telephones sockets 6' to which his telephone or telephones 4' are connected. In this case there is not really a difference for the subscriber from having a Wired Local Loop since he does not see any difference. The telephones 4' are connected to the telephone sockets 6' which are connected to a so called Subscriber Fixed Station, SFS, 2', which is connected to an antenna 7', e.g. arranged on the roof of a building or similar via which is established a radio connection with abase Station, BS 1', 1". The short dashed arrow indicates that there is little interference between adjacent base stations 1', 1". Up to now the Fixed Radio in the Local Loop, FRLL, concept has only been implemented to a very limited extent. Radio microwave link connections or special developed radio technology is merely used to provide telephone service for isolated islands, remote farms or similar. Lately however, FRLL-systems based on existing analogue cellular technology have been installed in countries which have a general lack of capacity in the public wired telephone network. One implementation is further described in brochure no. LZT 120217, Radio ACCESS System RAS 1000 by Ericsson Radio Access AB. These systems are addressing a time limited market, since general applications will require effective encryption of a high quality voice and ISDN (Integrated Services Digital Network)-service, in order to achieve that a digital radio access technology is required. An essential feature of the Fixed Radio in the Local Loop, FRLL, is that it enables installations which are economic as to frequency and power since directional fixed roof mounted antennas can be installed at the subscriber buildings. For example a 15 dB antenna gain could give 20–30 dB back-front isolation leading to a re-use cluster size as low as 1 leading to typically ten times higher frequency. effiency compared to the Mobile Radio in the Local Loop, MRLL, which is going to be further discussed hereinafter. This frequency efficiency is essential for providing the higher bit rates required for the high voice quality as well as for ISDN-services. The directional antennas also reduce the potentional risk for quality degradation due to time dispersion. An important drawback with the FRLL is however that the customer does not get any mobility benefit.

Mobility is provided through the MRLL, which is an advantage. This concept however also suffers from drawbacks, e.g. the radio infra-structure becomes very frequency inefficient and requires very expensive base station installations due to range limitations. The reason therefore is that a perfect radio connection is required in every part of the house independent of building materials, underground basements, topography, temporary placement or position of the portable telephone etc. This is very hard and expensive to achieve. Furthermore, no antenna gain will be available on the customer's side and the mobile units can not be high power units. This could easily lead to a 40 dB higher path loss compared to FRLL. A 40 dB path loss for the $D^4$ propagation model leads to 100 times more base stations (BS) than for the FRLL-concept if the transmitting power is the same (essentially due to ten times less worst case range). Furthermore, as mentioned above, in some countries the telephone operators are prevented from offering mobility through the particular regulations in said countries. Furthermore, due to the above-mentioned limitations, MRLL is up to now only available as test systems and has not yet been commercially implemented. This is further described in the paper "Universal Digital Portable Communications: an Applied Research Perspective", ICC '86, Toronto, Canada, Jun. 22–25, 1986 by D. C. Cox et al.

A schematic illustration of the MRLL-concept is shown in FIG. 3 where subscriber mobile stations, SMS, 5', (portable telephones) are directly communicating with a base station 1', 1" via a radio connection. As can be seen the connection is direct as well for indoor as for outdoor connections. The long dashed line indicates that there is a high level of interference between base stations.

If so wanted, mobility in a residence that has normal WLL or FRLL can of course be provided by a private purchase of a standard commercially available cordless telehphone. This is illustrated in FIG. 4 where a separate cordless fixed part (CFP) is connected to the subscriber socket 9. The CFP can communicate with the cordless portable part (CPP). The cordless telephone is however not a part of the basic local loop provision made by the operator but merely a privately allowed extension. Furthermore, two separate radio systems have to be tandemed which leads to an extra delay of the speech signal, as well as it is expensive. Furthermore, if the cordless phone uses digital transmission digital speech coding/decoding has to be carried out twice. The mobility further is limited and different frequency bands are required for the private and the public link respectively.

SUMMARY

The object with the present invention is to solve the above mentioned problems through an arrangement which is reliable, not expensive, frequency efficient and which may, at the same time provide mobility. Furthermore, the arrangement has to provide a high speech quality and the grade of service, GOS, should be the same as for a wired connection. The invention can thus be said to combine the advantages of the above discussed FRLL-system with the above mentioned MRLL-system. It is an object of the invention to provide frequency efficient radio connections between base stations, BS, and portables in or around residences or offices. A further object of the invention is to provide efficient, low cost, intercom functions between portables within a residence or an office, in the following simply called a house. A further object with the invention is to provide the possibility to register the indoor radio connection under a private license, e.g. in case the telephone operator is not allowed to provide mobility as is the case in certain countries as mentioned above. Another object of the present invention is to provide a wide mobility. Another object is to give the possibility of using the same frequency band for a private as well as for a public link.

These and other objects are achieved through an arrangement for radio communication comprising at least one first station or base station, a number of second radio stations and a number of subscriber stations, each said radio station comprising at least one digital radio arrangement and first and second means for communication with said first station and with said at least one subscriber station respectively, said first means comprising at least one long range antenna for connection with the first station or base station, wherein the said second means comprises at least one antenna for connection with at least one of said subscriber stations, said digital radio arrangement comprising a radio switch with one single common transceiver providing wireless communication or connection with said first station as well as with at least one subscriber station.

Further objects and advantages with the present invention will be clear from the following description of the invention. According to an advantageous embodiment e.g. frequency planning is avoided by utilising decentralized dynamic channel allocation.

According to the invention the so called Subscriber Fixed Station, SFS 2' as shown in FIG. 2, is upgraded to a simple radio Multiple Access Subscriber Fixed Station, MASFS, forming a radio exchange, which provides radio connections between base stations and portable subscriber mobile stations in or around houses, as well as between separate subscriber stations. Due to the fact that according to the invention, a radio switch with one common transceiver (transmitter/receiver) is used, the delay of the speech signal is considerably smaller than when two separate systems have to be tandemed. According to a preferred embodiment a subscriber station may connect not only to the MASFS, but also directly to the base station (BS) within reach.

According to an advantageous preferred embodiment of the invention, a so called Multi Carrier Time Division Multiple Access Time Division Duplex, MC/TDMA/TDD, technology is used which uses continuous or instant dynamic channel allocation. This is further described in "Novel Radio Access Principles Useful for Third Generation Mobile Radio Systems", the third IEEE International Symposium on Personal, Indoor and Mobile Radio Communications, Oct. 19–21, 1992 by D. Åkerberg, the present inventor, Ericsson Radio Systems AB which hereby is incorporated by reference. According to this reference, hereinafter called ref A, Continuous Dynamic Channel Selection, CDCS, implies that the station or switch selects the, in the moment of selection, best channel from a frequency resource which is common to all subscriber stations in all houses. Therethrough frequency planning for base stations or for individual subscribers is avoided.

A particular embodiment relates to a system or an arrangement comprising base and mobile stations and radio time division multiple access (TDMA) time division duplex (TDD) utilizing dynamic channel allocation (DCA) with portable controlled handoff.

There it is possible to further extend coverage and local traffic capacity of such a cellular system by insertion of a wireless basestation.

Wireless systems based upon the mentioned technology can provide coverage of an area by installing wired basestations, which provide service to a large number of mobile stations. These systems exist on different scales ranging from Macro-cells for wide area outdoor applications to micro- and pico-cells for indoor high density applications. There is an increasing interest in applying this technology to provide wireless communications for personal communications services (PCS) or for replacement of wiring in the local loop. In these applications coverage is still an issue of planning and installation of wired connections. As such there is interest to extend coverage by adding wireless basestations. Such an arrangement would be very flexible and allow efficient coverage planning. In addition such an arrangment would provide local mobility and traffic capacity for handling local calls.

This embodiment relates more in detail to an application for systems based on TDMA technology with DCA and portable controlled handoff, e.g. with reference to the Digital European Cordless Telecommunications standard (DECT), ETS 300 175. DECT standard comprises a MC/TDMA/TDD technology with 10 carriers of 12 duplex channels, the frame cycle time is 10 [ms].

This embodiment would e.g. in a DECT-like system allow mobile stations to simultaneously access wired and wireless basestations as TDD frames are synchronized, so that their downlink transmissions occurr in the same half of the frames. Such a frame synchronization of basestations within one such a system is necessary to support inter-basestation roaming and handover.

Through said embodiment the wireless basestation is fully compatible with standard wired basestations and wireless terminals but in addition allows the wireless basestation to fulfill identical requirements as a wired basestation, in other words the wireless terminal does not have to see the difference between a wireless and a wired basestation. As such the wireless basestation can be part of the radio system network. The wireless basestation may also provide local switching of calls due to its TDMA architecture and as such can provide local extra traffic capacity of the wireless network in terms of users.

BRIEF DESCRIPTION OF THE DRAWINGS

The invention will in the following be further described by way of example in a non-limiting way with reference to the appended drawings wherein:

FIG. 2 illustrates fixed radio in the local loop;

FIG. 3 illustrates mobile radio in the local loop;

DETAILED DESCRIPTION

Figure 1:
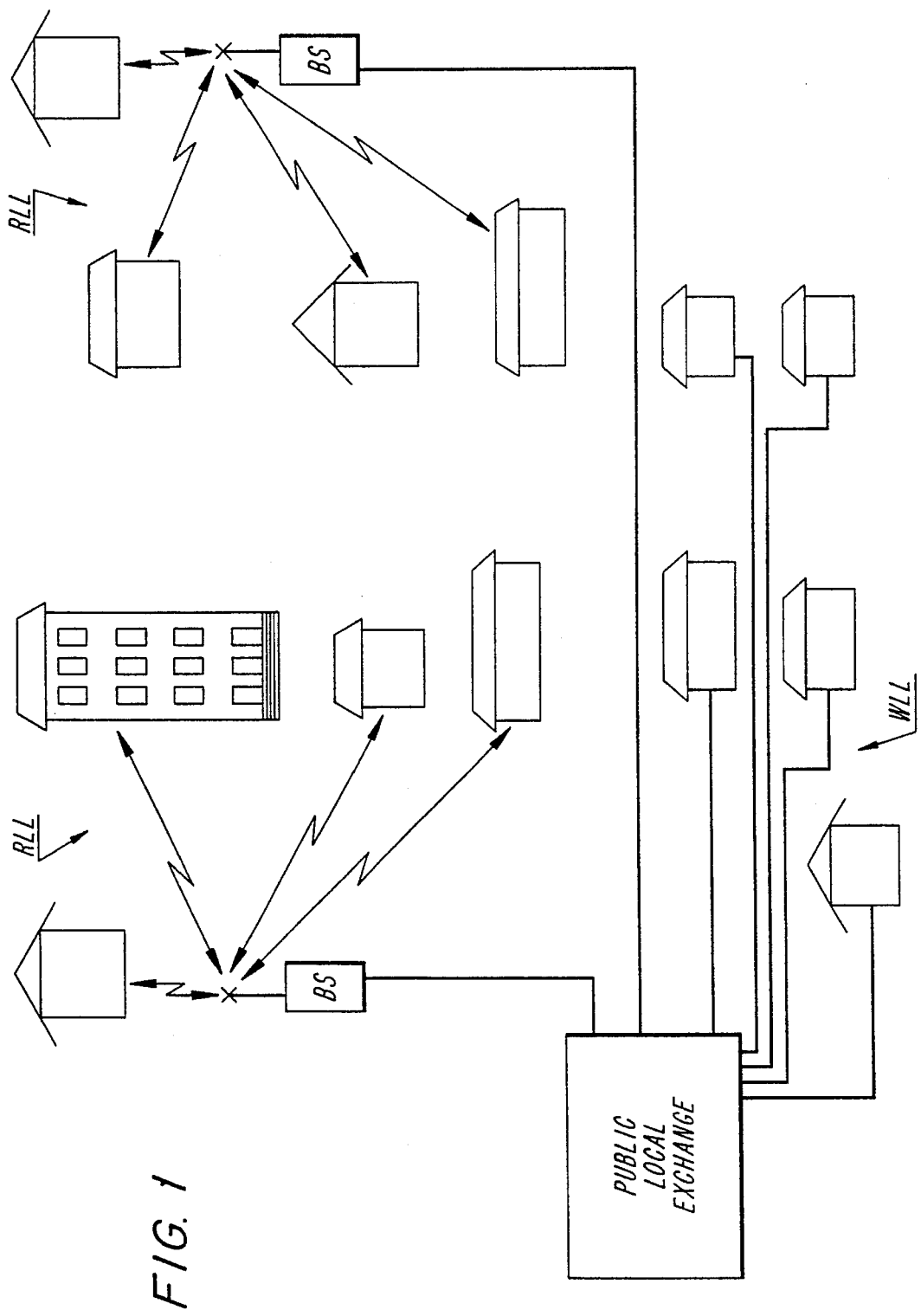
FIG. 1 is a simplified illustration of wired local loops and radio local loops.
Figure 4:
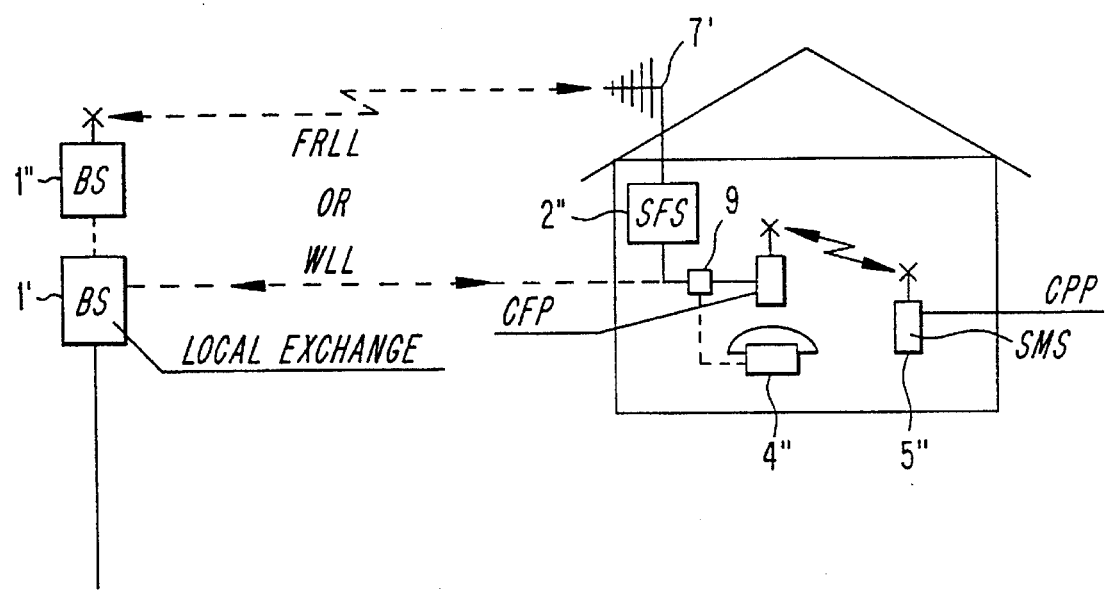
FIG. 4 shows a separate cordless fixed part connected to a subscriber socket.
Figure 5:
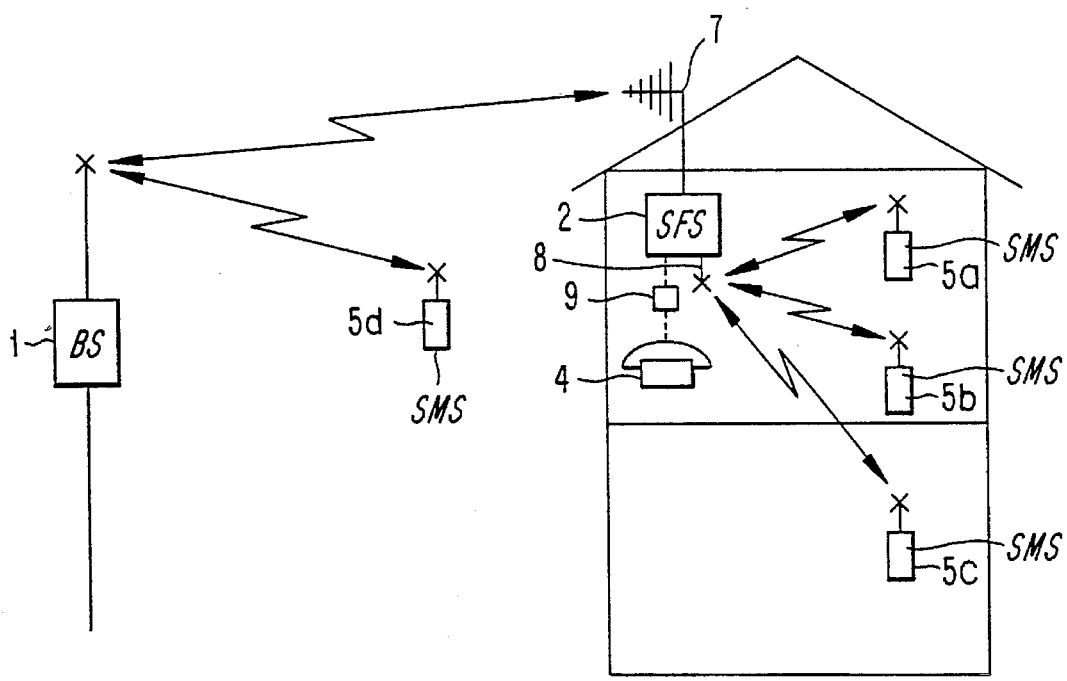
FIG. 5 illustrates second station interconnecting subscriber mobile stations and a base station.

FIG. 5 discloses an arrangement comprising a base station (BS) 1, a second station 2 in the form of a low cost single radio subscribers' station, and four subscribers mobile stations or mobile units 5a, 5b, 5c, 5d (SMS). A Subscriber Fixed Station 2 which in this case is a so called Multiple Access Subscriber Fixed Station, MASFS 2, comprises a public connection over a roof antenna 7 for connections to the base station 1. The three subscriber mobile stations (SMS) 5a–5c are all located within or in the vicinity of the house and are connected to the Subcriber Fixed Station 2, which as stated above is a Multiple Access Subscriber Fixed Station, MASFS, over an indoor antenna or a short range antenna 8 via antennas on each subscriber mobile station 5a–5c. If the MASFS switches the public connection via the roof antenna 7 to a local connection to a subscriber mobile station 5 via the indoor antenna 8, than mobility has been provided. If two local connections, via the indoor antenna, are interconnected, then an intercom function has been provided. How all this is done via a single TDMA MASF radio will be further described under reference to FIG. 9. It is also possible to let a portable or a subscriber's mobile station 5d have an additional access right directly to the base station 1 or generally to the Fixed Radio in the Local Loop (FRLL) base station network. Therethrough an even wider mobility is obtained.

The second station 2 may furthermore be equipped with a standard (two wire) socket interface 9 (dashed line illustrates the connection). In the figure only one second station 2 is shown although there may of course be more than one second station. The short range antenna 8 may be a so called OMNI-antenna but this is not necessary.

Figure 6A:
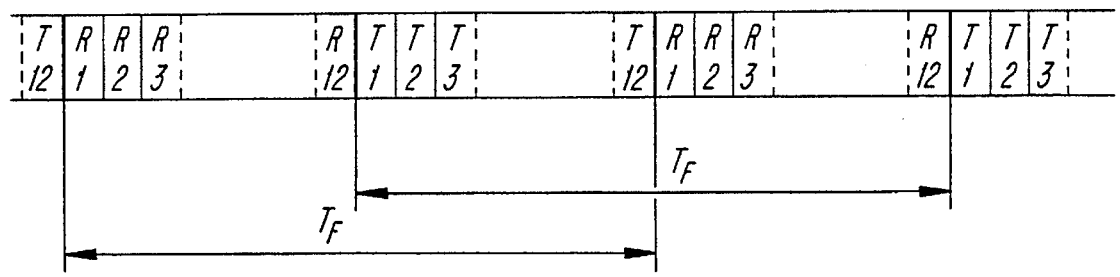
FIG. 6a illustrates a Time Division Multiple Access (TDMA) frame comprising 12 duplex channels.

The concept is based on a Fixed Radio in the Local Loop system using time division technology e.g. in the form of TDMA or TDM radio technology. TDMA/TDD (Time Division Duplex) as illustrated by FIG. 6a thereby constitutes an advantageous embodiment. In FIG. 6a a so called TDMA frame is shown which has 12 duplex channels, 12 receiving slots and 12 transmitting slots. Of course a different number of receiving and transmitting slots may be used. According to one embodiment the arrangement is applied for the Digital European Cordless Telecommunications standard, DECT. DECT standard is 12×12 timeslots. $T_F$, the frame cycle time is about 10 [ms] for the DECT system. In the figure T and R denote transmit and receive slots respectively whereas the numbers denote linked slots for duplex connections. Generally, however, a typical value for $T_F$, $T_F$ being the cycle time of a TDMA-frame, is 10 ms.

Figure 6B:
FIG. 6b is an example of transmitted data on a slot where the "control data" regularly contains the access rights identity information.

A typical slot structure is shown in FIG. 6b. The control data regularly contains multiplexed information on identity and access rights, synchronization references, services available and so on. Also paging and call set up procedures are carried over the control channel. A typical speech codec is 32 kb ADPCM. That means that for each speech call 320 bits have to be transmitted and received during every frame ($T_F$=10 ms). The user data therefore has to contain 320 bits for speech. Control data will typically need 64 bits and the synchronization field 32 bits. Including guard space the total number of bits per slot may be 480. If a frame has 12 transmitting and 12 receiving slots, the bit rate will be 480×24×100 bits per second or 1152 kbits per second.

According to this embodiment the system is a multicarrier, MC, system. There could be 10 carriers with 1.0–1.8 MHz carrier spacing depending on modulation method. One example is the DECT-standard. In ref A and U.S. Pat. No. 4,628,152, there is described how channels are selected using dynamic channel selection. It is also referred to the references cited in Ref A which hereby also are incorporated by reference, namely ETSI. "Radio Equipment and System (RES): Digital European Cordless Telecommunications (DECT) Common Interface". ETS 300175-1 to -9, ETSI, "Digital European Cordless Telecommunications Reference documents", ETR 015, ETSI "Radio Equipment and Systems (RES): Digital European Cordless Telecommunications (DECT) Common interface Services and facilities requirements specification", ETR 043 and ETSI, "Radio Equipment and Systems: Digital European Cordless Telecommunications (DECT) A Guide to the DECT features that influence the traffic capacity and the maintenance of high radion link transmission quality, including the results of simulations", ETR 042. As to the embodiment using Multi Carrier TDMA/TDD, in order to give enough channels (frequency/time slot combinations) the BS and MASFS 2 can still be single radio transceivers but with the possibility to change carrier in the guard band between slots, which is further described as the standard base station concept in ref A and Swedish Patent Number SE-B-466279. In this way a large number of channels can be accessed by the MASFS 2 (and portable subscriber stations SMS 5) with only one radio.

Returning now to FIG. 5 the second station 2 comprises a so called Multiple Access Subscriber Fixed Station (MASFS) and is connected to two time-shared antennas 7, 8. The outdoor antenna 7 or the roof antenna comprises according to one embodiment directional gain (e.g. 10–18 dB) for long range and is directed towards the closest base station 1 whereas the indoor antenna system 8 for short range comprises no antenna gain. The Time Division Multiple Access provides the SFS, Subscriber Fixed Station, 2 with means to have several simultaneous active connections on one single radio by utilizing different time slots for different connections which is further illustrated in FIG. 7 where an intercom function is illustrated. It shows how one single TDMA radio provides a low cost single radio switch, i.e. the interconnection switch is provided by merely shifting user data received from a first subscriber station 5$f$ in one receiving slot e.g. R4 to the transmitting slot e.g. T7 being used by a second subscriber station 5$g$. The shifting is carried out e.g. by a digital first-in-first-out, FIFO, memory where the output R4 is delayed in order to fit the time of the wanted transmitting slot T7. (In the figures the receiving slots are denoted with an R whereas the transmit slots are denoted with a T and, in both cases, with the corresponding number.

Figure 7:
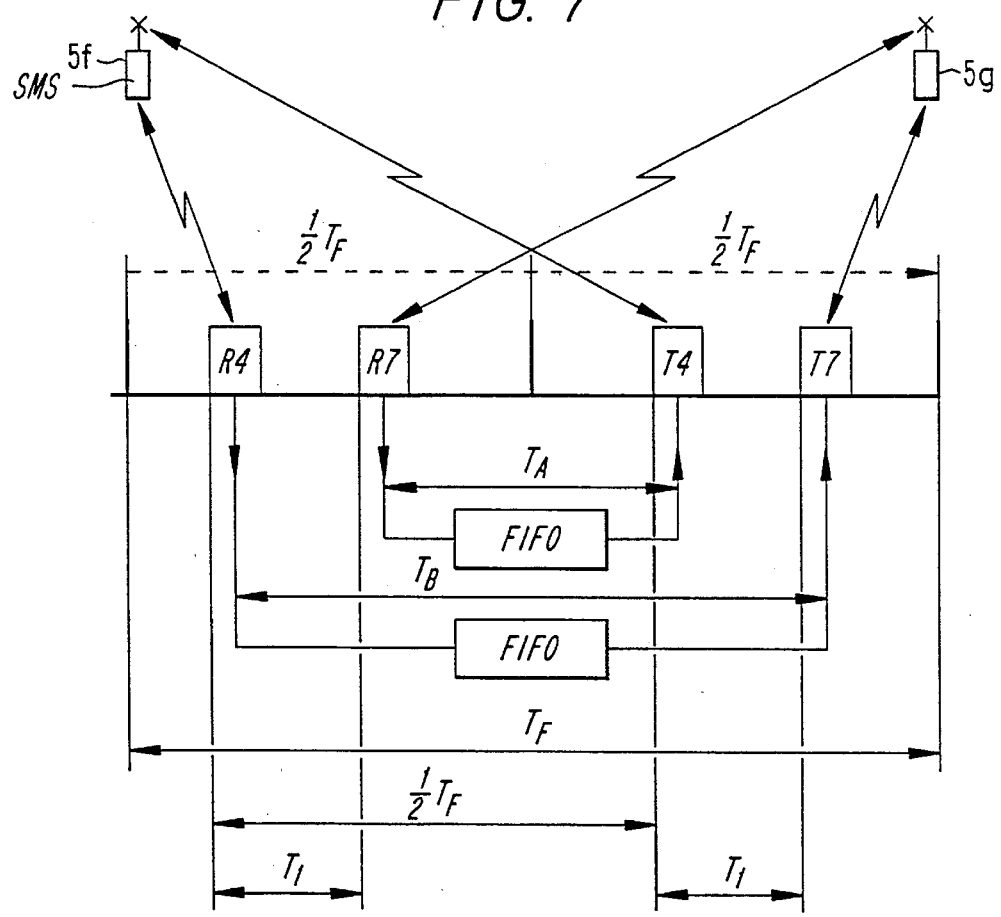
FIG. 7 illustrates one single TDMA radio utilizing different time slots for different simultaneous connections.
Figure 8:
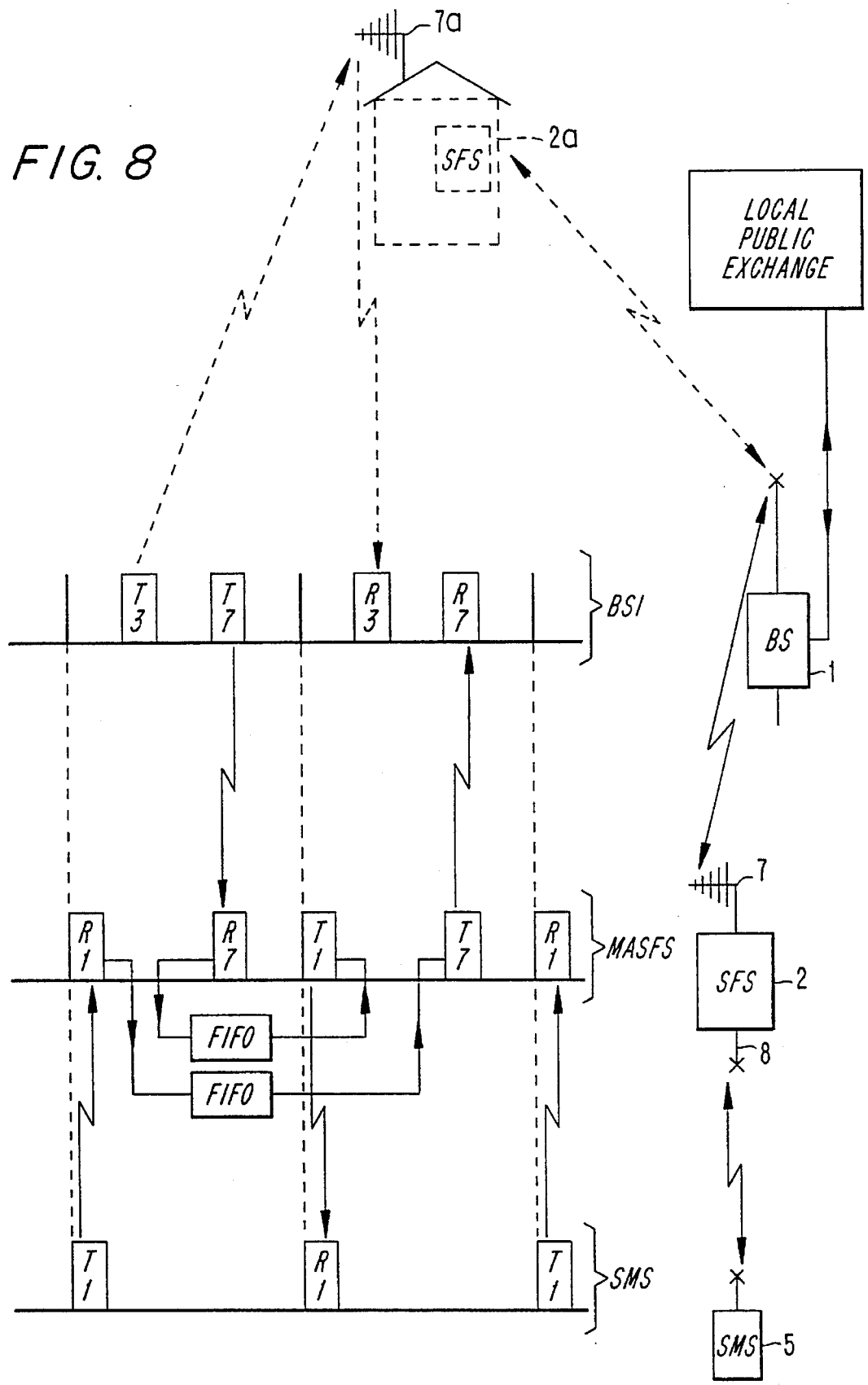
FIG. 8 illustrates TDMA time slot synchronization and information flow over the radio.

In FIG. 8 it is further illustrated how the Multiple Access Subscriber Fixed Station, MASFS 2 comprises one public connection via the roof antenna or the outdoor antenna 7 to the base station 1 of the FRLL BS using slot-pair 7 and at the same time comprises connections to a subscriber mobile station or portable telephone 5 via an indoor antenna 8 using slot-pair 1. The base station 1 may in turn also be connected to e.g. another Subscriber Fixed Station 2$a$ (shown by dashed lines) which also is provided with long range or outdoor antennas 7$a$, in this case a roof antenna system 7$a$ using slot-pair 3. The figure intends to illustrate TDMA time slot synchronization and information flow over the radio between base station 1 (BS), Subscriber Fixed Station 2 (MASFS) and subscriber Mobile station 5 (SMS). The base station 1 is connected with wires to a public local exchange. As further described in FIG. 14, the speech from the public exchange is coded and multiplexed into a TDMA/TDD frame in the base station 1. As further described in FIG. 15, the MASF, 2, further interconnects in a single radio the public connection on slot-pair 7 to a private connection to a portable station, SMS, 5 on slot-pair 1. The MASFS interconnection is made by use of so called FIFO-memories which was further described above in relation to FIG. 7. Synchronization will be further described later on.

Figure 9:
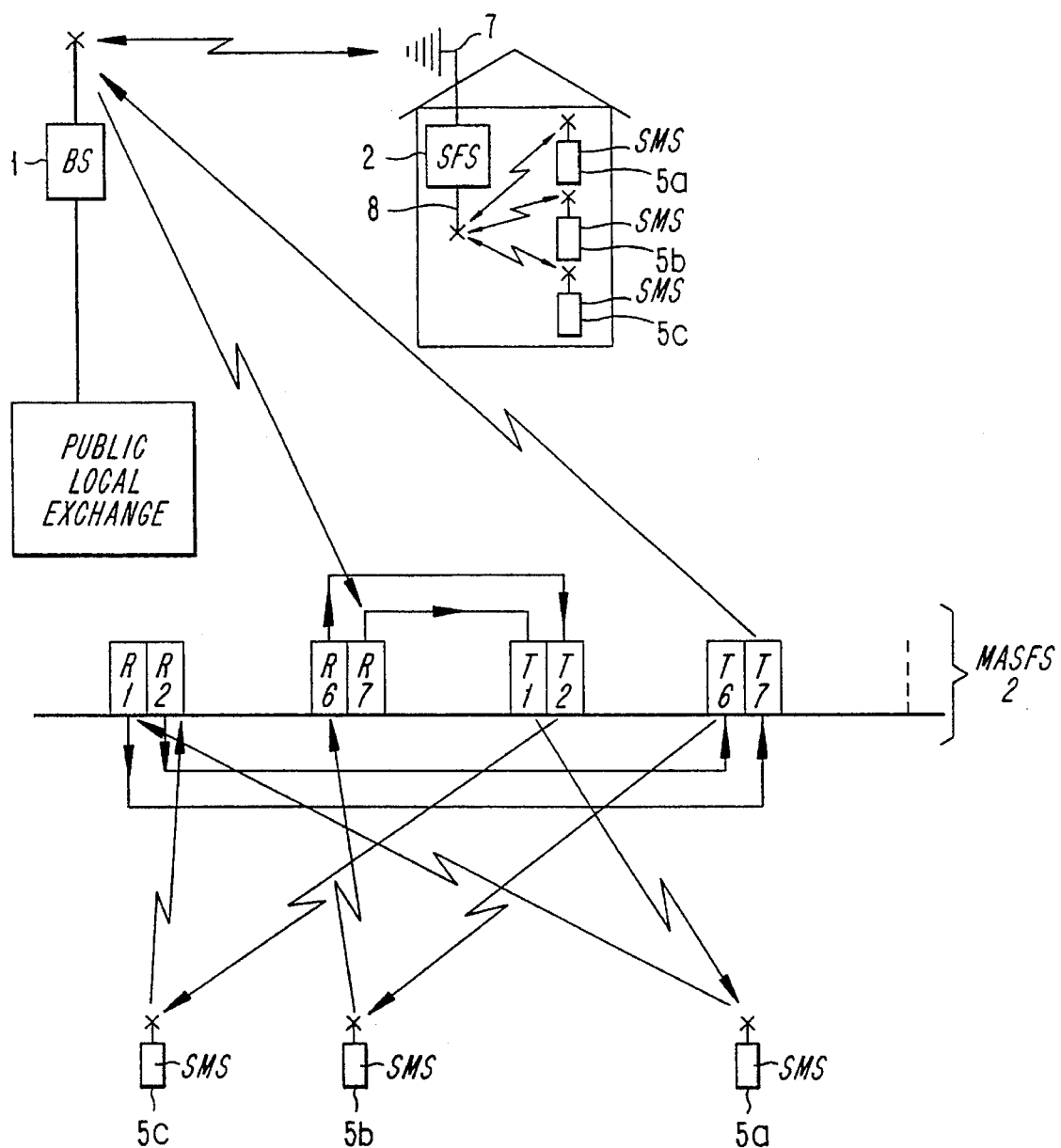
FIG. 9 illustrates a Multiple Access Subscriber Fixed Station (MASFS) intercommunication functions.

FIG. 9 illustrates an example of two calls via the Subscriber fixed station or the MASFS 2. One call comprises a connection between the base station 1 and a subscriber station or a portable SMS 5$a$ whereas the other call comprises a connection between two subscriber stations 5$b$, 5$c$, particularly two portables SMS 5$b$ and SMS 5$c$. If a public connection over antenna 7 is connected to a private connection to portable 5$a$, then mobility has been provided. If two private connections are being interconnected, i.e. the connections to subscriber station 5$b$ and subscriber station 5$c$, then an intercom function has also been provided.

In the embodiment according to FIG. 9 wired lines from a public local exchange are connected to the base station 1.

It should be noted that the interconnection functions via the first-in-first-out memories or the FIFOs as more thoroughly described above in FIG. 7, do not add any processing to the speech information. Therefore the quality is not influenced or degraded. The speech coding only takes place in the base station 1 and in the subscriber station 5, SMS. However, a delay is introduced which is equal to an increment of the two-way delay with $T_F$ ms where $T_F$ is the cycle time of the TDMA frame. This is derived from FIG. 7, where the additional 2-way delay is $T_A+T_B=\frac{1}{2}T_F-T_1+\frac{1}{2}T_F+T_1=T_F$.

The FRLL base stations are normally broadcasting a unique public access rights identity, see ref A. As described in Ref A, since the Paging and System information is available on every downlink channel, a handset can lock to any downlink transmission and derive the required system information. If it contains the wanted Access Rights Identity, it is possible to make and receive calls. The access rights identity (the system and base station identity) is transmitted in almost every slot, while other system information is transmitted less frequently.

Examples of broadcast system information that has to be derived by a handset before it is allowed to transmit are: system identity (primary access rights identity), base station identity, frame synchronization, multiframe synchronization, number of transceivers per base station and synchronization and order of receiver scanning of RF-channels; frame number for cipher synchronization, the RF carriers allowed to be used by the system, fixed parts capabilities and secondary access rights information.

The base station identity makes it possible to make call set up and handover to the closest and strongest base station.

The multiframe synchronization is needed, e.g., for the handset current saving, since a paging sequence always starts as a multiframe boundary.

The information on used carriers can be used for, e.g., local barring of channels to avoid local interference, or for system related barring, or for later extension or decrease of usable frequency bands. It may also inform on preferred channels. The fixed parts capability informs on, e.g., speech codec type, fax, data services etc.

The secondary access rights information provides the means for sharing base stations between different operators. DECT has a powerful and flexible identity and addressing structure that provides for, e.g., hosting private user groups in a large public system, hosting public access in private systems, and hosting public access from several service providers in a system owned by one of the public service providers. The same handset can be equipped with access rights to several public and private operators. Only Subscriber Fixed Stations, SFS, or Subscriber Mobile Stations, SMS, with the same public access rights will lock to the FRLL BS. The MASFS 2 will on the internal antenna 8 transmit a unique private access rights key. Only subscriber stations or Subscriber Mobile Stations, SMS 5, with the same private access rights key will lock to the MASFS 2 and thus be ready to receive a call and/or to make a call. A Subscriber Mobile Station 5 may be equipped with both a public and a private access rights key which will give him mobility not only in and around his home or his office but everywhere as long as he is within reach of a FRLL BS. Returning now to FIG. 8 it is therein shown how the slots T3, T7, R3, R7 carry the public connections whereas slots R1, T1 carry the on a private connections.

This gives a possibility to use a common frequency band for both public and private connections but also to use different, normally adjacent, bands.

Figure 11:
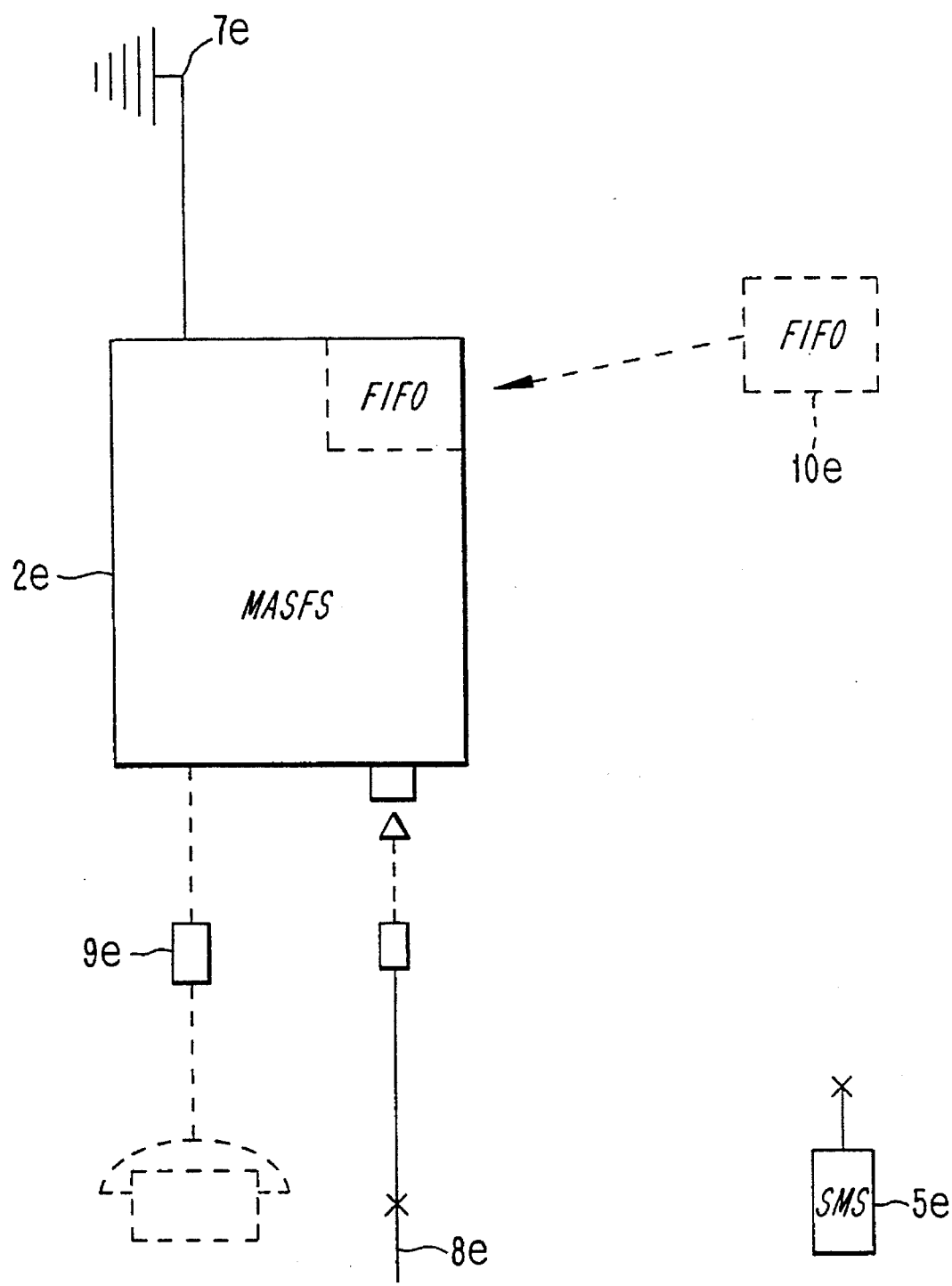
FIG. 11 illustrates an arrangement comprising a private mobility extension.

If the operator, as referred to above, is not allowed to provide mobility, the subscriber may be provided with a Subscriber Fixed Station (SFS) with a wired extension with a standard telephone socket 9e. This is illustrated in FIG. 11 and it is thereby supposed that the Subscriber Fixed Station, SFS, is built according to a standard lake DECT where both licensed local loop applications and cordless private (unlicensed) residential and office system are allowed on a common frequency band. Frequency planning for different stations in the system is avoided by dynamic channel selection which is also further described and exemplified in the abovementioned reference A. If the customer desires to require mobility, he may, from a manufacturer, or if necessary a relevant authority or similar entity, acquire a private fixed part access rights identity, an indoor antenna 8e and an assembly card 10e with FIFOs and a mobile subscriber station (portable handset) 5e. The unique private access rights identity is programmed into the MASFS 2e and the subscriber mobile station 5e. For the public link of the external antenna 7e a unique public access rights key is used preventing an SMS with only a private access rights key to communicate with the base station BS (not shown). Thus the SFS has been upgraded to a MABFS with the additional function of a private residential or offices cordless telephone system which may include intercom functions as illustrated in FIG. 9.

Figure 10A:
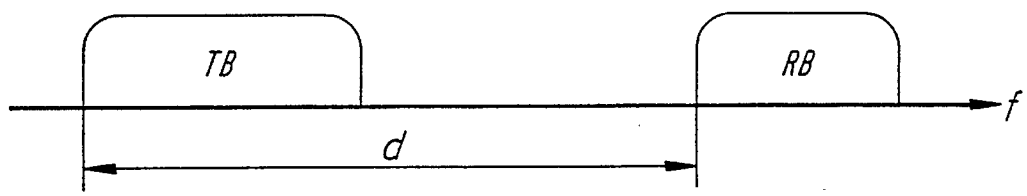
FIG. 10a illustrates the frequency bands of an arrangement based on Time Division Multiple Access with Frequency Division Duplex, (TDMA/FDD)
Figure 10B:
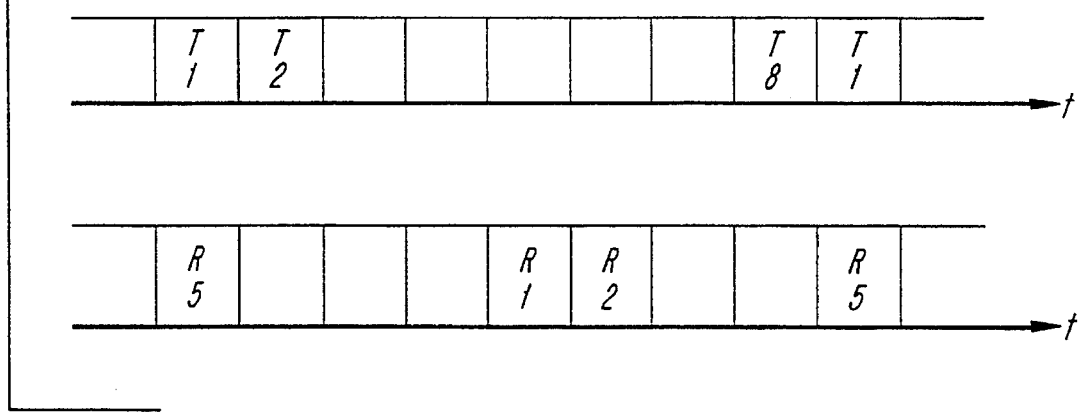
FIG. 10b illustrates the shifting of transmitting and receiving slots in a system according to FIG. 10a, FIG. 10c very schematically illustrates an interleaved TDMA/TDD scheme.

The embodiments described in FIGS. 6–9 relate to the use of Time Division Multiple Access with Time Division Duplex, TDMA/TDD which illustrates one way of carrying out the invention, a way which is cheap and efficient. However, according to a further embodiment Time Division Multiple Access with Frequency Division Duplex or TDMA/FDD can be used. This is illustrated in FIGS. 10a and 10b wherein FIG. 10a illustrates a frequency axis with a transmitting band TB and a receiving band RB and where the duplex distance, d, is indicated. In FIG. 10b the transmitting T and receiving R slots respectively are illustrated where the receiver slot numbers are shifted in relation to the transmitting slots in order to avoid the need for duplex filters in portables or subscriber mobile stations. In this case abase station receives and transmits at the same time on different frequencies which makes the station more expensive and normally duplex filters will be needed unless carrying out transmission and reception in different time slots as illustrated. However, since the MASFS should be a low cost item, all receptions and transmissions have to be done in different slots which limits the numbers of possible connections to the half of the available transmitting slots.

Figure 10C:
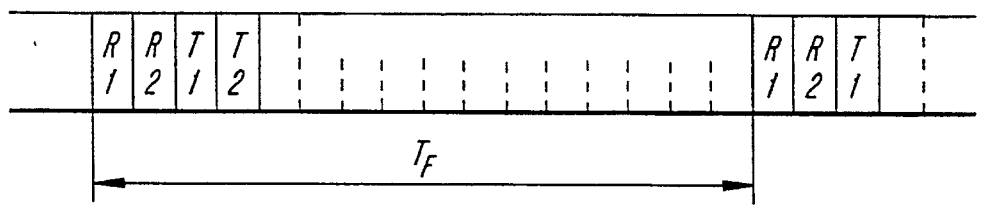

According to an alternate embodiment it is possible to use a so called interleaved TDD scheme which is schematically illustrated in FIG. 10c.

For further illustration block diagrams are shown for a base station, a second station (MASFS) and a subscriber mobile station (SMS) respectively each using one single MC/TDMA/TDD radio with 12 pairs of slots for duplex transmission.

Figure 12:
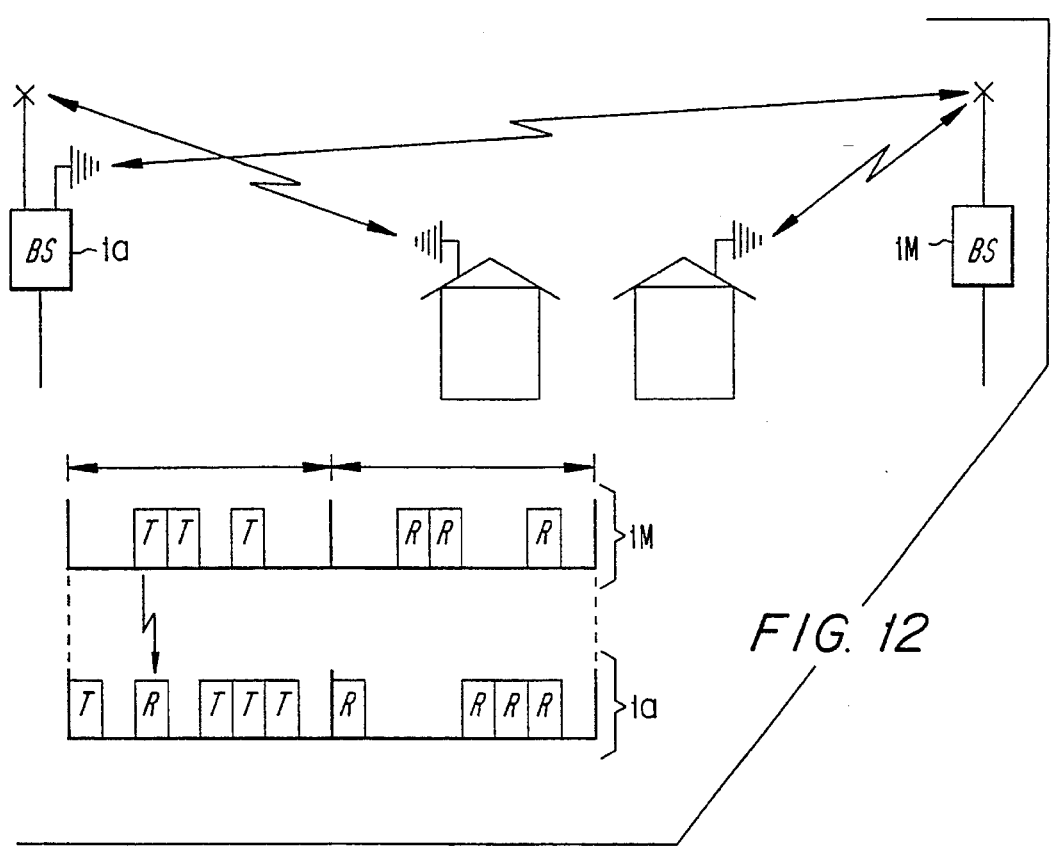
FIG. 12 is an illustration of synchronization between base stations.
Figure 13:
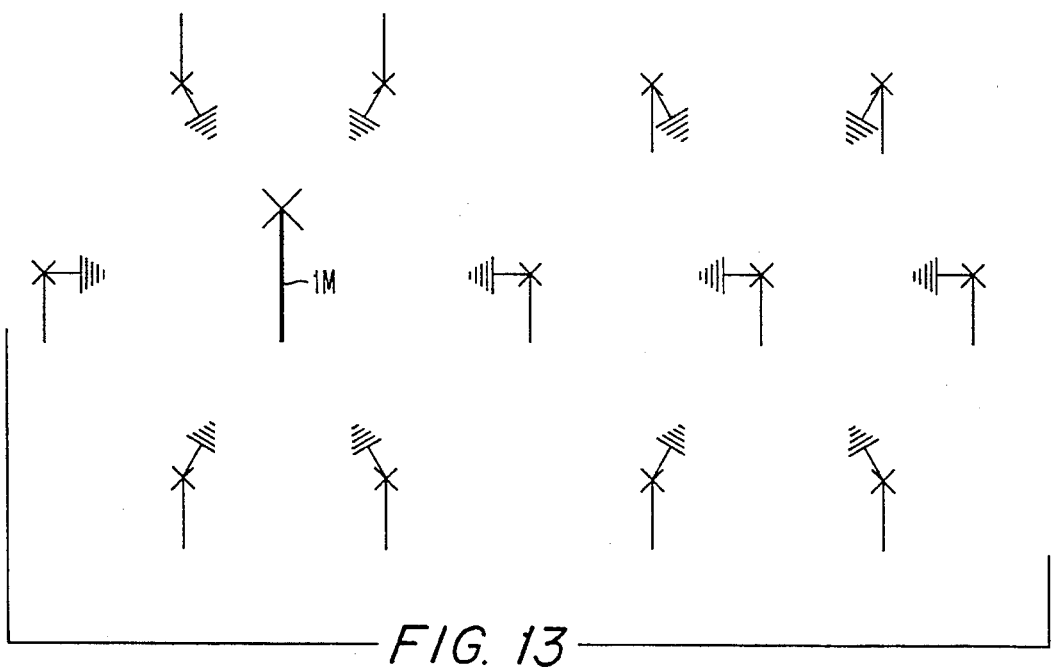
FIG. 13 is a schematic illustration of synchronization of a whole network.
Figure 14:
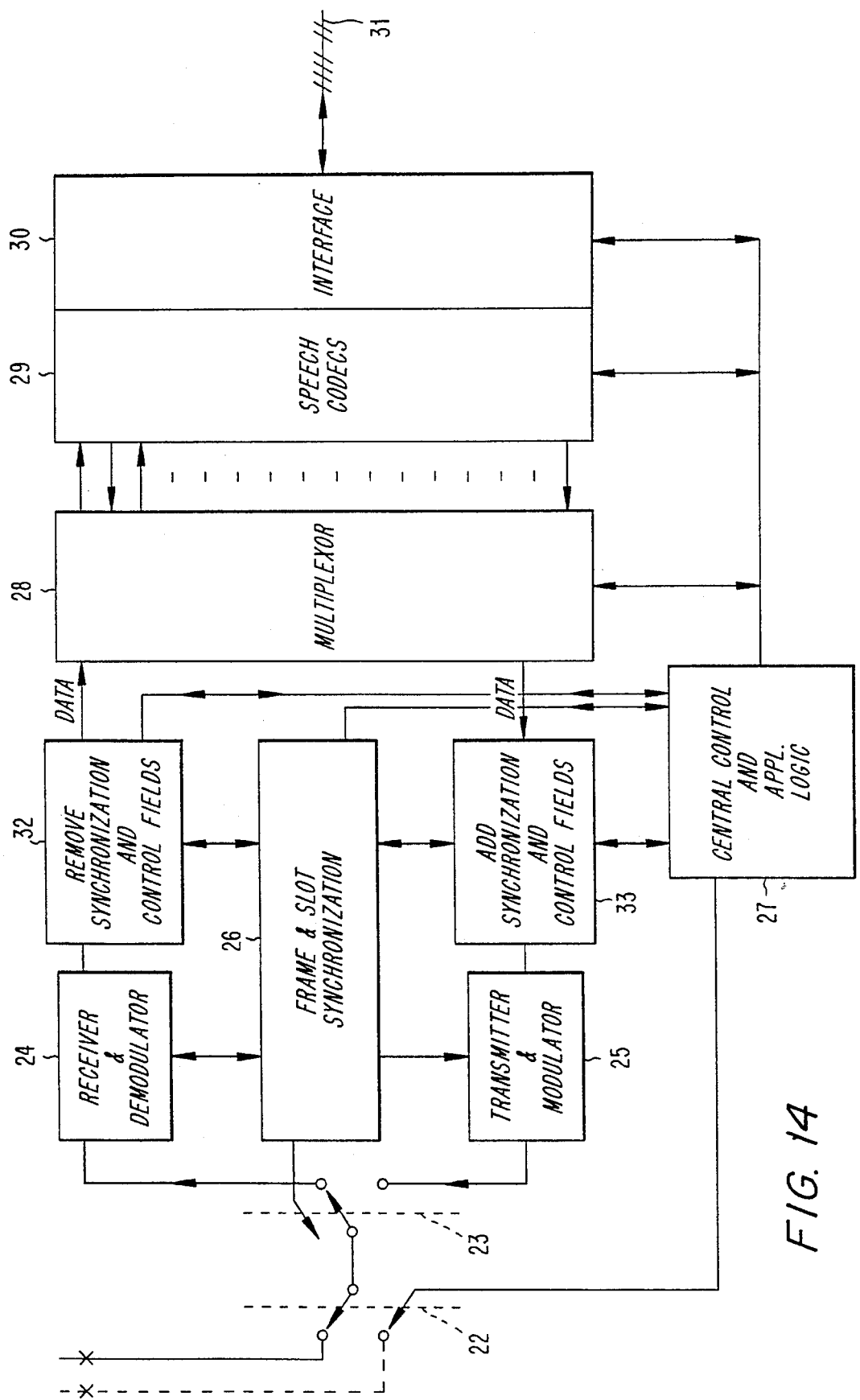
FIG. 14 illustrates a block diagram of a base station (BS)

FIG. 14 shows a block diagram for a base station. It has a wired connection 31 to a local exchange. This is a trunk or a multiline connection for up to 12 simultaneous calls. These calls are transcoded into ADPCM formate by the speech codecs 29. The central control and application logic 27 detects incoming calls and controls outgoing calls, selects suitable combination of carrier and time slot and merges via the multiplexer 28 the different connections or suitable time slots. FIG. 8 shows an example of how a base station has selected slot pair 3 and 7 for two different connections. Choice of carrier frequencies are not indicated in FIGS. 8 and 9. The base station in FIG. 14 has a frame and slot synchronisation unit 26 which controls the slot reception and transmission timing. The timing reference is internally generated or derived from a synchronisation signal sent on the wires from the public exchange. It may also be derived over the receiver from a master-base station as indicated in FIGS. 12 and 13.

The central control logic 27 also controls the T/R switch 23 and the antenna diversity switch 22 if antenna diversity is implemented. If antenna diversity is not implemented, then the switch 22 is not needed. If a connection is bad, the control logic first tries the other antenna 22, and if this does not help, changes the radio channel.

Figure 15:
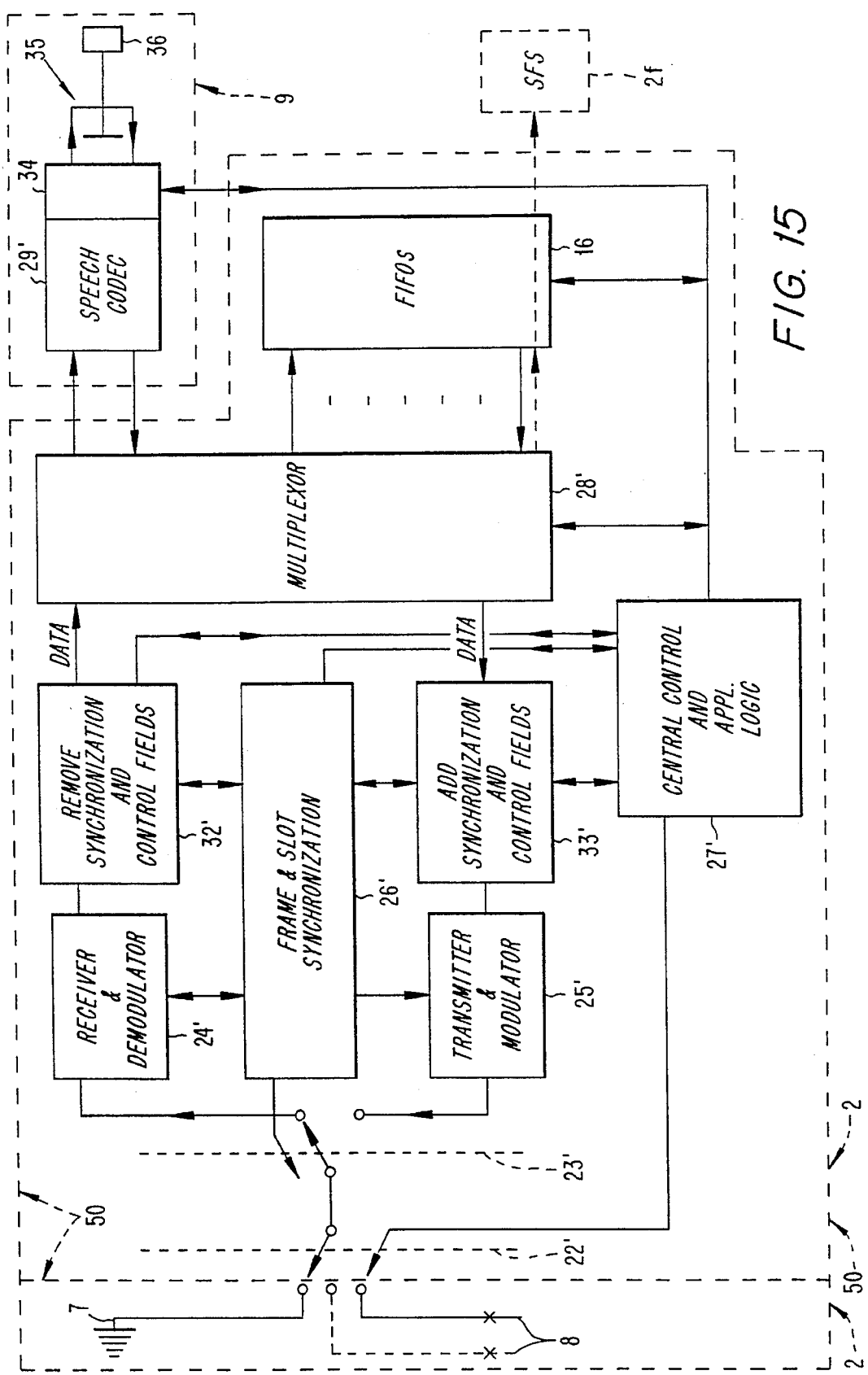
FIG. 15 illustrates a block diagram of radio exchange in the form of a MASFS.

In FIG. 15 a block diagram of a MASFS 2 is illustrated. This is almost identical to the block diagram for the base station. The main difference is firstly that there is an outdoor antenna which is directional and one (or two if antenna diversity) indoor antenna(s), and secondly that there is only one speech codec 29' terminated with a 4-2 wire hybrid circuit 35 and a standard socket 36 for a standard telephone connection and thirdly the FIFOs 16 for the radio switching. Detection and generation of DTMF tone signals and ring signals are carried out in the unit referenced 34. The control logic 27' connects 22' the external antenna for the time slots, communicating with the base station BS, see FIG. 8, and connects the internal antenna for time slots communicating with the subscriber mobile station, SMS. In FIG. 8 the slots number 7 have been selected for a connection between the base station BS and the MASFS. The MASFS receiver 24' (FIG. 15) is locked to the transmission T7, FIG. 8. From the control field, FIG. 6b, of T7, FIG. 8 it derives the synchronisation reference for the frame and slot synchronization 26', FIG. 15.

The MASFS 2 has an internal time reference which will be used if the connection to the FRLL BS is lost.

The data part of slots T7 and RT, FIG. 8, may be switched to the codec 29' and be decoded, FIG. 15, and converted to standard wire telephone signals available at the standard socket 36, or alternatively multiplexed to the FIFOs 16 and retransmitted with new access rights codes in the control field, FIG. 6b, to the SMS. In FIG. 7 slots 1 have been chosen for the connection between MASFS and SMS. T7 and R7 have a public access rights identity and T1 and R1 a private access rights identity. For transmissions between two SMSs as indicated in FIG. 9, using slots 2 and 6, there is no change of antenna nor any change of access rights identity. The data from the two connections is via the multiplexer 28' shifted into the FIFOs 16 and the control logic 27' shifts the data back to the multiplexor in right time as indicated in FIG. 7.

Figure 16:
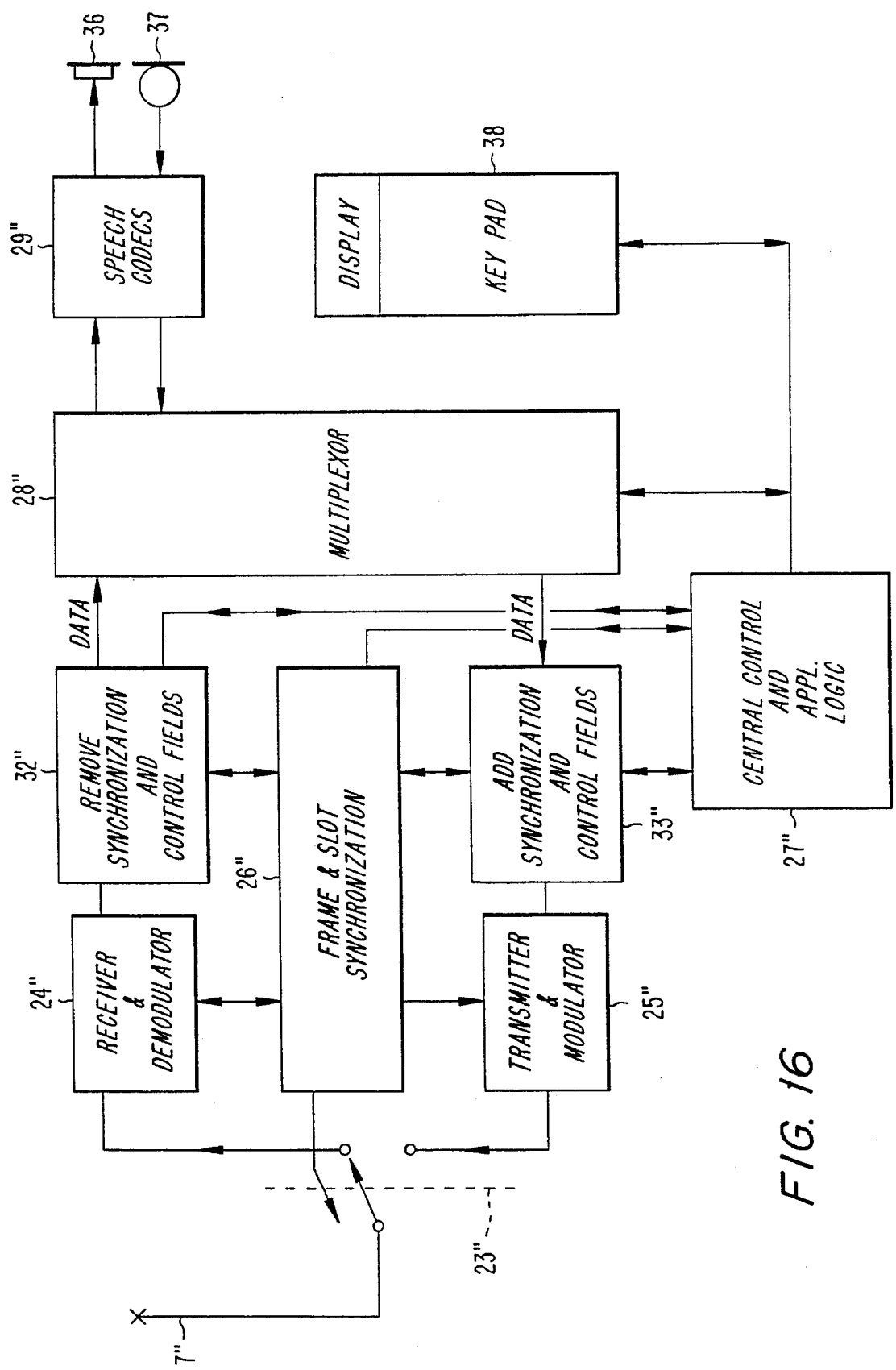
FIG. 16 illustrates a block diagram of a Subscriber Mobile Station (SMS)

The SMS, as illustrated in the block diagram in FIG. 16, has a similar function as the MASFS. It has only one antenna 7" and only one codec 29" connected to microphone 37 and speaker 36 and a keypad with a display 38. This is per se known from the design of a portable cordless phone. The further units and functionalities correspond to the units as shown in FIG. 15.

When there are no active connections, the base station may transmit a low capacity beacon signal, i.e., a dummy bearer including its access rights identity, and the MASF may do the same over the indoor antenna with its access rights identity. In this way the MASF knows that it is within range of the base station, BS, and the SMSs know that they are in range of the MASF Such a beacon concept is described in ref. A. As described in Ref. A, in order to provide for uncoordinated installations in a multioperator environment where a common frequency resource is shared, it is necessary that both traffic channels and control channels are continuously dynamically selected.

In this kind of environment it is likely that the same handset has access rights to several systems, e.g. a residential system, an office system and several public systems. Thus it is important that each base station continuously broadcasts access rights and other system information. Call set up attempts by handsets through blind interfering transmissions are avoided, since each handset will know if a suitable service is available by listening only. DECT handsets may transmit only after they succeeded to lock to a base station with the wanted access rights identity.

The broadcast information on a down link control channel is most essential. If the control channel is interfered with, call setup is impossible (or may be possible through a complicated escape mechanism). A special part of the frequency band is generally not allocated to control channels, because this may impose unwanted restrictions on the control channel structure, and it is probably easier to find an interference free channel with unrestricted selection over the entire frequency band.

In DECT the down link broadcast and control channel are available as a part of every downlink transmission. Besides the traffic bearers a down link dummy bearer is defined, which only contains the synchronization field and the broadcast and control channel part (A-field) of a traffic bearer.

The down link broadcast information has to be continuously transmitted from each DECT base station. Where no downlink traffic channels are active, one or two dummy bearers can be active. Where at least one downlink traffic channel is active, one or fewer dummy bearers can be active. When two active dummy bearers are used, they should be transmitted on different antennas.

The dummy bearer is always active at low traffic, but is very short and does not steal essential capacity. For example, in an environment of unsynchronized systems, a dummy bearer loads the radio environment with a load corresponding to only 10% of that of a duplex traffic channel.

The system is allowed to make frequent short breaks in the dummy bearer transmission to check if it is still on a least interfered with channel. If not, change information is broadcasted and the dummy bearer is moved accordingly. This ensures that the downlink broadcast bearer stays at a least interfered with channel. When there is much traffic from a base station, no dummy bearers are needed since the broadcast information is derivable from each downlink traffic bearer.

Figure 18:
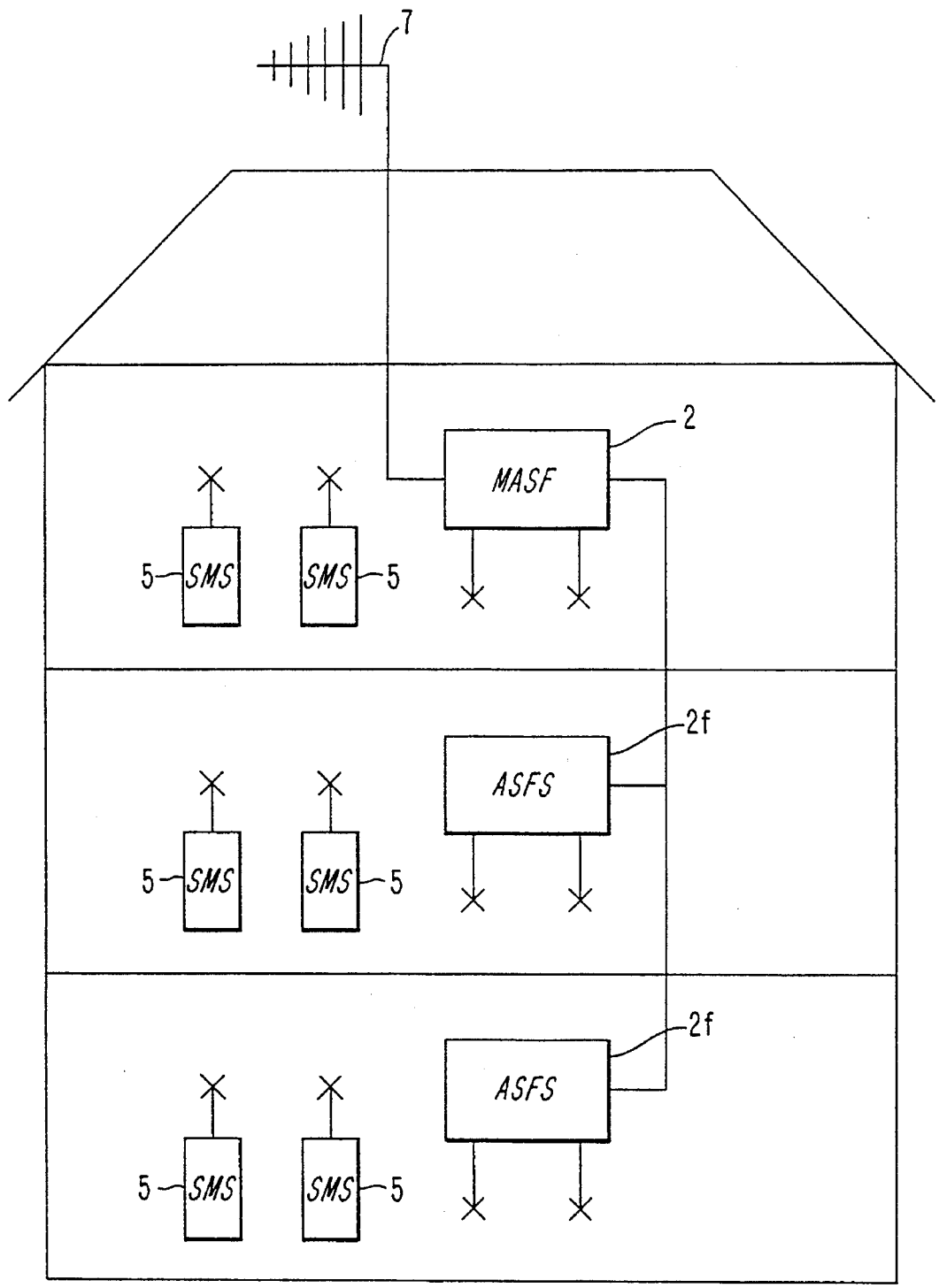
FIG. 18 illustrates schematically two additional subscriber fixed stations connected to one MASFS.
Figure 19:
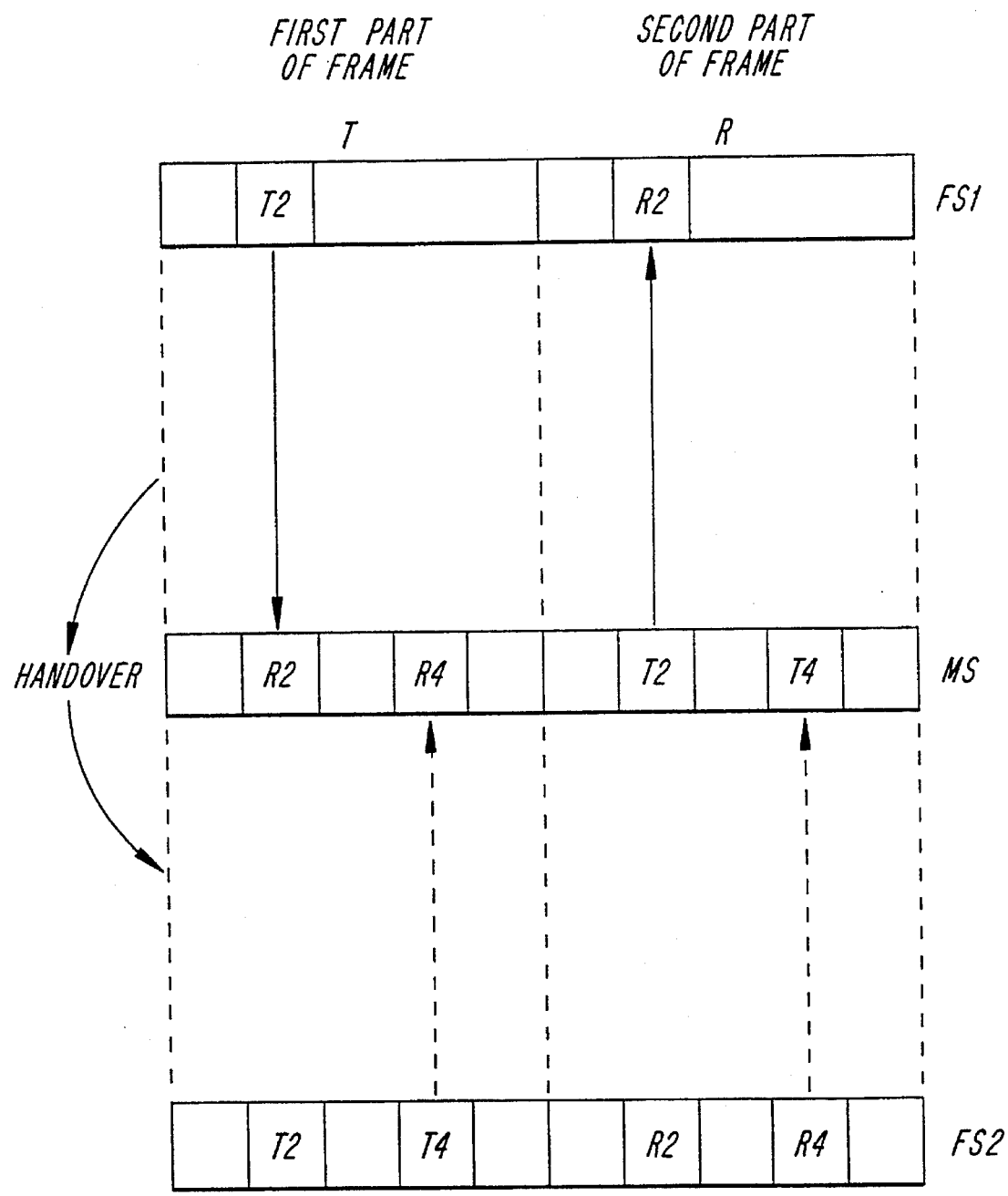
FIG. 19 illustrates how a mobile station makes a handover from a first fixed station to a second fixed station and FIG. 20 illustrates an embodiment with a slot allocation of MASFS which meets particular handover requirements.
Figure 20:
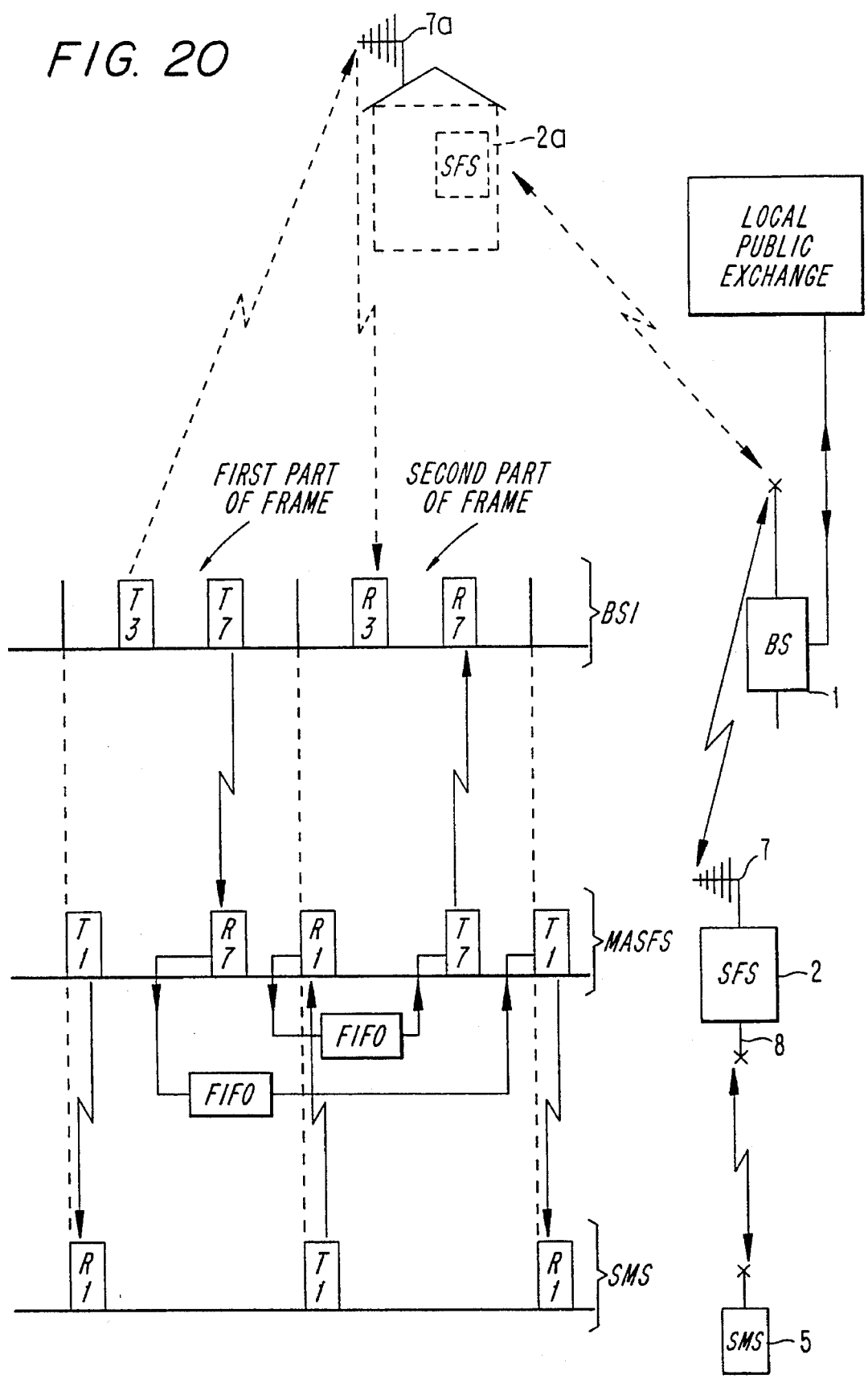

According to a particular embodiment a further illustrated in FIGS. 19 and 20 a handover is possible between MASFS and BS and between MASFS and ASPS and between ASFS's of FIG. 18. A typical handover procedure is further described in the above mentioned ref A. As described in ref A, the handover is portable controlled. Without interrupting the current connection it regularly scans the other channels and records a ranking list of least interfered with channels and of base stations that are stronger than the original one, and is thus prepared to perform a very quick bearer handover (20 ms). The base station gives immediate feed back on quality of received slots to the portable.

Handover is made as soon as another base station is, say, 10 dB stronger than the one of the current connection. Thus in a well engineered system, seamless handover is always performed before the link quality degrades.

The concept as implemented for DECT provides a quick seamless handover that does not need central control or complicated procedures. The key is TDMA in combination with the portable controlled Dynamic Channel Selection. The old link is maintained on one slot in the portable, while the new link is set up to the closest base station on another "best" time slot. When the new link is established, the (new) base station requests the central control to make a seamless switch from the old to the new radio link. This is an important TDMA feature.

The nature of CDCS is such that a channel in use can (occasionally) be stolen, and therefore the quick DECT intercell and intracell handover increases the capacity and cuts call curtailments drastically. It is important not to depend on the old channel to quickly set up the new. If calls are not set up to and kept to the closest base stations through handover, the capacity of the system and the link quality decreases.

FIG. 19 illustrates how a mobile station makes handover from a connection on channel 2 on a first fixed station to a connection on channel 4 on a second fixed station.

In most systems, applications such as handover requires that the frames and transmit and receive slots of the two fixed stations are synchronized as shown in FIG. 19. As already mentioned, a portable may have access rights to both the BS's and the MASFS's. That opens up the issue of providing handover between MASFS and a BS (Base Station). FIG. 8 illustrated the basic principles for providing mobility via a MASFS. However, there it is not refined or optimized for a handover procedure between BS and MASFS. It can be seen from FIG. 8 and the embodiment illustrated therein that the transmit (and receive) slot from the MASFS to the SMS do not appear in the same halfframe as in the MS as required for simple handover as illustrated in FIG. 19.

FIG. 19 illustrates a first connection to fixed station 1 (FS1) e.g. MASFS using traffic channel 2. MS illustrates the mobile station. A new traffic channel 4 is used for the handover to fixed station 2, PS2 e.g. BS1.

In FIG. 20 is therefore shown an alternate embodiment of slot allocation of MASFS which also meets these handover requirements. The MASFS has exactly the same properties and functionality as described above in relation to FIG. 8 with the exeception that the transmit slots for connections to SMS are moved to the first half of the frame whereas the receive slots are located in the second half of the frame.

Thus mobile connections directly to a BS and mobile stations connected to a MASFS will have transmit and receive slots synchronized in the same half frames. Consequently, the conditions for simple handover are met. The added loop delay is $T_F$ as for the embodiment illustrated in FIG. 7.

The low gain antennas of the MASFS do not need to be indoor for general applications of the invention but could be used to provide local coverage and local mobility in a more general service.

A more detailed description related to the example of FIG. 20 is as follows:

As described above with regard reference A, BS 1 is always active on at least one transmit channel. Each downlink transmit channel provides broadcast information on BS identity, access rights identity, synchronization etc. It also broadcasts incoming call requests. During the first half frame the MASFS listens to transmissions from BS 1 on all slots that are not used for transmission from MASFS to SMS's and MASFS is locked to one of the active transmissions from the and waits for set up requests.

During the first half frame, the MASFS also is transmitting on at least one slot. This provides broadcast information from the MASFS to all SMS's. MASFS acts as a base station to SMS with specific BS identity (not the same as BS 1) and specific access rights identity. All SMS's are during the first half frame locked to a MASFS down link transmission. In the second half frame the MASFS listens on all slots (that are not used for transmission from MASFS to BS 1) for set up requests from SMS's.

Towards BS 1, MASFS acts as a mobile unit and towards SMS it acts as a base station. Detailed description of call set up and handover is found in ref A, as described above.

Call set-up's, channel quality control, channel selection and intracell handover is handled independently for the link BS 1-MASFS and the link MASFS-SMS.

Since these links are independent only the user data FIG. 6b, is transparent through the MASFS. The control data part, FIG. 6b, contains broadcast information, call set up information, quality information and handover information that is unique for each of the two links. The user data repeater functions of a MASFS are thus only a part of the integrated functionality of a MASFS concept.

According to the invention there can be more than one call from the base stations 1 to the subscriber mobile stations 5. The MASFS 2may be given several call possibilities from the base station to several subscriber stations 5. A call connection may also utilize several slots for one connection, e.g. to transfer ISDN (Integrated Services Digital Network) which requires more band-width than a normal speech call.

Figure 17:
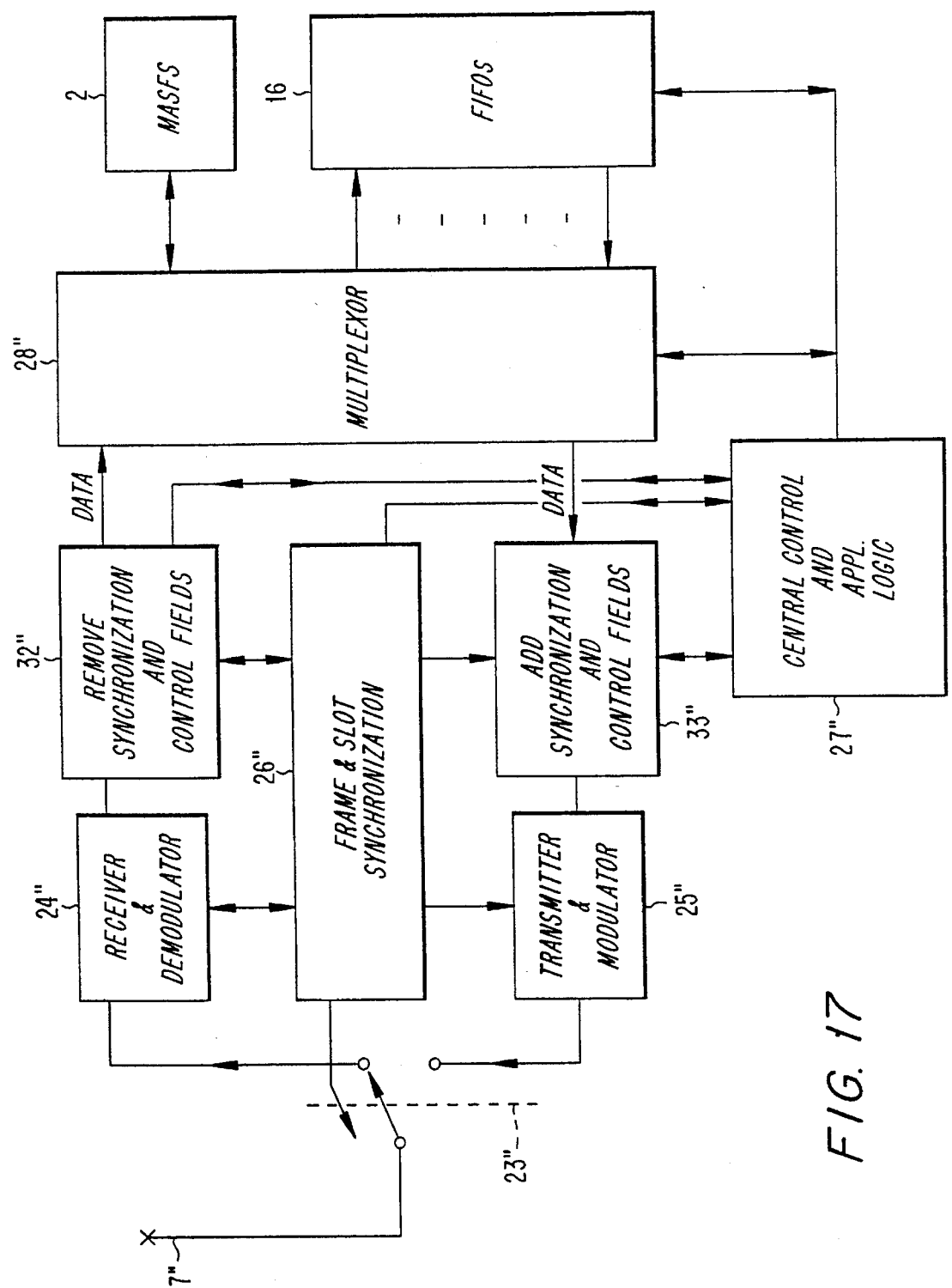
FIG. 17 illustrates an additional subscriber fixed station connected to a MASFS.

Furthermore, if there is much traffic as for example in an office the MASFS or the second station 2, and the base station 1, may comprise more than one digital radio arrangement. To the MASFS may be added one or more fixed stations (FIG. 17) only comprising indoor antennas for communication with mobile stations. The connection between MASFS and added stations ASFS 2f, see FIG. 17, is made through the multiplexers 28. Thus a switch function between two SFS stations is made by transferring the data received on one slot in one station to one slot in the other station via the multiplexors. FIG. 18 schematically illustrates a MASFS 2 to which two additional second stations 2f, i.e.,the so called Subscriber Fixed Stations ASFS, are connected e.g. via wiring. It is thereby possible to make a handover between MASFS 2 and ASFS 2f.

A further embodiment of the invention relates to the case where the the MASFS 2 comprises several radios, said radios being distributed to different locations thus forming an indoor pico cellular system for all indoor connections whereas one or more radios normally will be dedicated to the FRLL BS via the external antenna.

The concept with point to point outdoor connections using directional antennas and indoor normal antennae opens a possibility to utilize the same frequency spectrum for both outdoor and indoor connections with very little interference between the two utilizations. If the antenna gain is 15–20 dB on the external antenna, and at least 15 dB attenuation is added from indoor radios, there will be 30–35 dB isolation between the services. Thus, in average the whole frequency spectrum may be reused indoors or the other way around. However, also cases where interference will occur are possible, e.g. in the case of a subscriber mobile system, or a hand set, being used high up on a balcony. If consequently this concept with different antenna arrangements or systems, each first and second means or antennas may comprise an antenna system or more than one antenna even if in the foregoing it has generally been denoted merely "antenna" for reasons simplicity, for indoor and outdoor usage respectively is combined with dynamic channel allocation, see ref A, then the quality of each service will be kept on a high level due to hand-over escape from temporary occasional interference. As described in ref A, antenna base station diversity as applied for DECT provides and combines different types of diversity: antenna diversity by changing the antenna radiation pattern, frequency diversity by intra-cell handover to another carrier and macro diversity by intercell handover. Diversity increases capacity, extends the range and decreases the time dispersion effects. Application of antenna base station only diversity is simple for the Standard Base Station and is effective due to TDD.

In the following is described how synchronization as well between base stations (FIG. 12) as of a whole network (FIG. 13) advantageously may be carried out. According to this embodiment synchronization is provided via radio between base stations 1a, LM. Under some circumstances it might be important to time synchronize close by the base stations. If the base stations 1a, 1M are not synchronized to each other, the system capacity could be decreased. The synchronization is carried out by assigning so called master base stations 1M which is illustrated in FIG. 13. The other base stations (with no denotation) are all so called slave base stations. Listening to a master base station 1M is done via a directional antenna at the so called slave base station. Since every base station always has at least one channel active, the slave base stations always have some transmissions to listen to. The diagram in FIG. 12 shows a base station 1a which is a slave base station and a base station 1M which is a master base station. The transmitting and receiving slots are uniquely numbered for example as in FIG. 6a. The slot number is regularly contained in the transmitted control data (FIG. 6b). Thus the slave base station 1a may listen to one of the master base station 1M transmissions, read the slot number and align the transmit/receive frame of slave base station 1a with the transmit/receive frame of master base station 1M as shown in the diagram of FIG. 12.

FIG. 13 gives an example of how a whole network could be synchronized. The slot for receiving the synchronizing signal must be connected to a directional antenna with at least as much gain as that used by the Subscriber Fixed Stations.

The antenna gain should be of the order 15–22 dB in order to get considerably higher field strength from the master transmitter than from other neighbour slave transmitters.

The invention shall not be limited to the shown embodiments but can be freely varied within the scope of the appended claims. For example, the arrangement does not have to be used in combination with the DECT standard but with any convenient system or standard.

What is claimed is:

1. An arrangement for radio communication comprising:
   at least one first radio station;
   a plurality of subscriber stations; and
   a plurality of second radio stations, each second radio station comprising:
     at least one digital radio arrangement, said digital radio arrangement including radio switch means having a common transceiver for providing wireless communication with a first radio station and at least one subscriber station,
     first means for communicating with said first radio station, said first means comprising at least one long-range antenna, and
     second means for communicating with a subscriber radio station, said second means comprising at least one short-range antenna for local coverage.

2. The arrangement of claim 1, wherein said long-range antenna is an outdoor antenna, and said short range-antenna is an indoor antenna.

3. The arrangement of claim 1, wherein said long-range antenna is an outdoor directional antenna having gain.

4. The arrangement of claim 1, wherein said short-range antenna is an indoor omnidirectional antenna.

5. The arrangement of claim 1, wherein communication between subscriber stations communicating with each other via one second radio station is switched via said radio switch means in said second radio station without switching of said communication via said first radio station.

6. The arrangement of claim 1, having a common set of access channels both for communication between said first, second, and subscriber radio stations of said arrangement, wherein said access channels are dynamically selected from said common set of access channels for communication between said first, second, and subscriber radio stations.

7. The arrangement of claim 1, wherein communication between said first, second, and subscriber radio stations is based on Time Division Multiple Access (TDMA) in which information is exchanged in frames according to a set of predetermined rules, each frame comprising a plurality of time slots;

at said subscriber radio stations, a first half of said time slots of each frame is assigned for receiving information and a second half of said time slots of each frame is assigned for transmitting information such that time slots correspondingly located in said first halves and said second halves form duplex communication channels; and at said first and second radio stations a first half of each frame is used for transmissions to said subscriber radio stations and a second half of each frame is used for receptions from said subscriber radio stations, such that:

at a first radio station, user data is transmitted in at least one time slot of a first frame half in accordance with said predetermined set of rules, at a second radio station, user data from said first radio station is received via said long-range antenna in at least one time slot of a first frame half, and said received user data is retransmitted via said short-range antenna in at least one further time slot of a first frame half in accordance with said predetermined set of rules, and at a subscriber radio station, user data from said second radio station is received in at least one receive time slot of a first frame half.

8. The arrangement of claim 7, wherein at said subscriber radio station, user data is transmitted in at least one transmit time slot of a second frame half forming a duplex communication channel with said at least one receive time slot in accordance with said predetermined set of rules;

at said second radio station, user data is received from said subscriber radio station via said short-range antenna in at least one time slot of a second frame half, and said received user data is retransmitted via said long-range antenna in at least one further time slot of a second frame half in accordance with said predetermined set of rules; and at said first radio station, user data from said second radio station is received in at least one time slot of a second frame half.

9. The arrangement of claim 7, wherein said second radio station retransmits said received user data in a first frame half of a frame succeeding said frame in which said user data have been received at said second radio station.

10. The arrangement of claim 8, wherein said second radio station retransmits said received user data from said subscriber radio station in a second frame half of a frame succeeding said frame in which said user data have been received at said second radio station.

11. The arrangement of claim 7, wherein at each first radio station a first half of said time slots of each frame is assigned for transmitting information and a second half of said time slots of each frame is assigned for receiving information such that time slots correspondingly located in said first half and said second half form duplex communication channels; and the time slots in said first half and second frame half of said second radio stations can be both a transmit and receive time slot.

12. The arrangement of claim 11, wherein a first radio station can connect directly to a subscriber radio station and a handover of a connection can be provided between a first radio station and a subscriber radio station and between a second radio station and a subscriber radio station.

13. The arrangement of claim 8, wherein at each first radio station a first half of said time slots of each frame is assigned for transmitting information and a second half of said time slots of each frame is assigned for receiving information such that time slots correspondingly located in said first half and said second half form duplex communication channels; and the time slots in said first half and second half of said second radio stations can be both a transmit and receive time slot.

14. The arrangement of claim 13, wherein said second radio stations retransmit said received user data from said subscriber radio station in at least one further time slot of a second frame half forming a duplex communication channel with said at least one time slot of said first frame half of said first radio station.

15. The arrangement of claim 1, wherein said first radio stations have a first access rights identity authorizing communication between a first radio station and a second radio station; and said second radio stations have second access rights identities authorizing communication between a second radio station and a subscriber radio station.

16. The arrangement of claim 15, wherein each second radio station has a respective unique second access rights identity; and said subscriber radio stations are provided radio access if they have the unique second access rights identity of the second radio station to which they are related.

17. The arrangement of claim 15, wherein said first access rights identity is a public access rights identity authorizing public communications; and said second access rights identity is a private access rights identity authorizing private communications.

18. The arrangement of claim 15, wherein a subscriber radio station has at least one of the first access rights identity and a second radio access identity providing additional access directly to at least one of the first radio station and other second radio stations.

19. The arrangement of claim 15, wherein the first and second access rights identities are the same, whereby subscriber radio stations having said access rights identity are provided access to said first and second radio stations having said access rights identity.

20. The arrangement of claim 7, wherein said second radio stations continuously transmit on at least one time slot during said first frame half; a time reference for a subscriber radio station is derived from a transmission received from a second radio station; and a time reference for a second radio station is derived from a transmission received from a first radio station.

21. The arrangement of claim 1, wherein a first radio station uses a nominal transmit channel for receiving and locking to a transmission from another first radio station and for deriving frame and slot synchronization from the received transmission; and a receiver in the first radio station is switched during reception to an antenna having gain directed towards the other first radio station.

22. A method for radio communication between first, second, and third Time Division Multiple Access (TDMA) radio communication devices, wherein information is exchanged in frames in accordance with a set of predetermined rules, each frame comprising a plurality of time slots, wherein at said third communication devices a first half of said time slots of each frame is assigned for receiving information and a second half of said time slots of each frame is assigned for transmitting information such that time slots correspondingly located in said first halves and said second halves form duplex communication channels, and at said first and second communication devices a first half of each frame is used for transmissions to said third communication devices and a second half of each frame is used for receptions from said third communication devices, said method comprising the steps of:

transmitting user data in at least one time slot of a first frame half in accordance with said predetermined set of rules at a first communication device;

receiving user data from said first communication device in at least one time slot of a first frame half and retransmitting said received user data in at least one further time slot of a first frame half in accordance with said predetermined set of rules, at a second communication device; and receiving user data from said second communication device in at least one receive time slot of a first frame half at a third communication device.

23. The method of claim 22 further comprising the steps of:

transmitting user data in at least one transmit time slot of a second frame half forming a duplex communication channel with said at least one receive time slot in accordance with said predetermined set of rules at said third communication device;

receiving user data from said third communication device in at least one time slot of a second frame half and retransmitting said received user data in at least one further time slot of a second frame half in accordance with said predetermined set of rules, at said second communication device; and receiving user data from said second communication device in at least one time slot of a second frame half at said first communication device.

24. The method of claim 22, wherein said second communication device retransmits said received user data in a first frame half of a frame succeeding said frame in which said user data have been received at said second communication device.

25. The method of claim 23, wherein said second communication device retransmits said received user data from said third communication device in a second frame half of a frame succeeding said frame in which said user data have been received at said second communication device.

26. The method of claim 22, wherein at each first communication device a first half of said time slots of each frame is assigned for transmitting information and a second half of said time slots of each frame is assigned for receiving information such that time slots correspondingly located in said first halves and said second halves form duplex communication channels; and the time slots in said first and second frame half of said second communication devices can be both a transmit and receive time slot.

27. The method of claim 26, wherein a first communication device can connect directly to a third communication device; and a handover of a connection can be provided between a first communication device and a third communication device and between a second communication device and a third communication device.

28. The method of claim 23, wherein at each first communication device, a first half of said time slots of each frame is assigned for transmitting information and a second half of said time slots of each frame is assigned for receiving information such that time slots correspondingly located in said first halves and said second halves form duplex communication channels; and the time slots in said first and second frame half of said second communication devices can be both a transmit and receive time slot.

29. The method of claim 28, wherein said second communication devices retransmit said received user data from said third communication device in at least one further time slot of a second frame half forming a duplex communication channel with said at least one time slot of said first frame half of said first communication device.

30. The method of claim 22, wherein said second communication devices during said first frame half continuously transmit on at least one transmit time slot.

* * * * *